US011404171B2

(12) United States Patent
Reddy et al.

(10) Patent No.: US 11,404,171 B2
(45) Date of Patent: Aug. 2, 2022

(54) BUILDING ALARM MANAGEMENT SYSTEM WITH INTEGRATED OPERATING PROCEDURES

(71) Applicant: Johnson Controls Technology Company, Auburn Hills, MI (US)

(72) Inventors: Viswanadha Reddy, Gurgaon (IN); Chiranjib Dhar, Gurgaon (IN); Rajeev T. Singh, New Berlin, WI (US); Ishmeet Bhatia, Eros Garden (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 97 days.

(21) Appl. No.: 16/773,659

(22) Filed: Jan. 27, 2020

(65) Prior Publication Data
US 2020/0243203 A1     Jul. 30, 2020

(30) Foreign Application Priority Data
Jan. 28, 2019    (IN) .............................. 201911003308

(51) Int. Cl.
| | |
|---|---|
| *G08B 25/00* | (2006.01) |
| *G16Y 40/10* | (2020.01) |
| *G16Y 10/80* | (2020.01) |
| *G06Q 10/06* | (2012.01) |
| *H04L 67/52* | (2022.01) |

(52) U.S. Cl.
CPC ........ *G16Y 40/10* (2020.01); *G06Q 10/06316* (2013.01); *G06Q 10/063112* (2013.01); *G06Q 10/063114* (2013.01); *G06Q 10/063116* (2013.01); *G08B 25/001* (2013.01); *G08B 25/002* (2013.01); *G16Y 10/80* (2020.01); *H04L 67/52* (2022.05)

(58) Field of Classification Search
CPC .... G08B 27/005; G08B 27/006; G08B 25/10; G08B 21/02; G08B 27/001; F24F 11/32
See application file for complete search history.

(56) References Cited

U.S. PATENT DOCUMENTS

| | | | |
|---|---|---|---|
| 6,115,713 A | 9/2000 | Pascucci et al. | |
| 6,157,943 A | 12/2000 | Meyer | |
| 7,031,880 B1 | 4/2006 | Seem et al. | |
| 8,532,839 B2 | 9/2013 | Drees et al. | |
| 9,475,359 B2 | 10/2016 | Mackay | |
| 9,606,520 B2 | 3/2017 | Noboa et al. | |

(Continued)

*Primary Examiner* — Hongmin Fan
(74) *Attorney, Agent, or Firm* — Foley & Lardner LLP

(57) ABSTRACT

A method for automatically managing and responding to alarms in a building management system. The method includes obtaining an operating procedure comprising a set of action items to be performed in response to an alarm in the building management system. The method includes determining, for an action item of the set of action items, whether the action item is capable of being performed automatically by the building management system or whether the action item requires user involvement. The method further includes in response to determining that the action item is capable of being performed automatically, automatically performing the action item by the building management system. The method further includes in response to determining that the action item requires user involvement, providing the action item to a user device for action by a user.

17 Claims, 14 Drawing Sheets

(56) References Cited

U.S. PATENT DOCUMENTS

| | | |
|---|---|---|
| 9,639,413 B2 | 5/2017 | Drees et al. |
| 9,753,455 B2 | 9/2017 | Drees |
| 10,139,792 B2 | 11/2018 | Schmitt et al. |
| 10,197,977 B2 | 2/2019 | Salsbury et al. |
| 10,278,027 B2 | 4/2019 | Oliver et al. |
| 10,317,863 B2 | 6/2019 | Papadopoulos |
| 10,481,574 B2 | 11/2019 | Wiens-Kind et al. |
| 10,528,013 B2 | 1/2020 | Piaskowski et al. |
| 2009/0045937 A1* | 2/2009 | Zimmerman .......... G08B 17/00 340/506 |
| 2010/0058248 A1 | 3/2010 | Park |
| 2011/0087988 A1 | 4/2011 | Ray et al. |
| 2014/0316743 A1 | 10/2014 | Drees et al. |
| 2017/0322715 A1 | 11/2017 | Cohrt |
| 2018/0205567 A1 | 7/2018 | Piaskowski et al. |
| 2018/0259934 A1 | 9/2018 | Piaskowski et al. |
| 2018/0314496 A1 | 11/2018 | Moody et al. |
| 2018/0315301 A1 | 11/2018 | Subramanian et al. |
| 2018/0364654 A1 | 12/2018 | Locke et al. |
| 2019/0042629 A1 | 2/2019 | Park et al. |
| 2019/0052479 A1 | 2/2019 | Piaskowski et al. |
| 2019/0096147 A1 | 3/2019 | Park et al. |
| 2019/0107830 A1 | 4/2019 | Duraisingh et al. |
| 2019/0107831 A1 | 4/2019 | Duraisingh |
| 2019/0107832 A1 | 4/2019 | Strand et al. |
| 2019/0108013 A1 | 4/2019 | Duraisingh et al. |
| 2019/0109725 A1 | 4/2019 | Duraisingh |
| 2019/0109907 A1 | 4/2019 | Duraisingh |
| 2019/0244492 A1 | 8/2019 | Horgan et al. |

\* cited by examiner

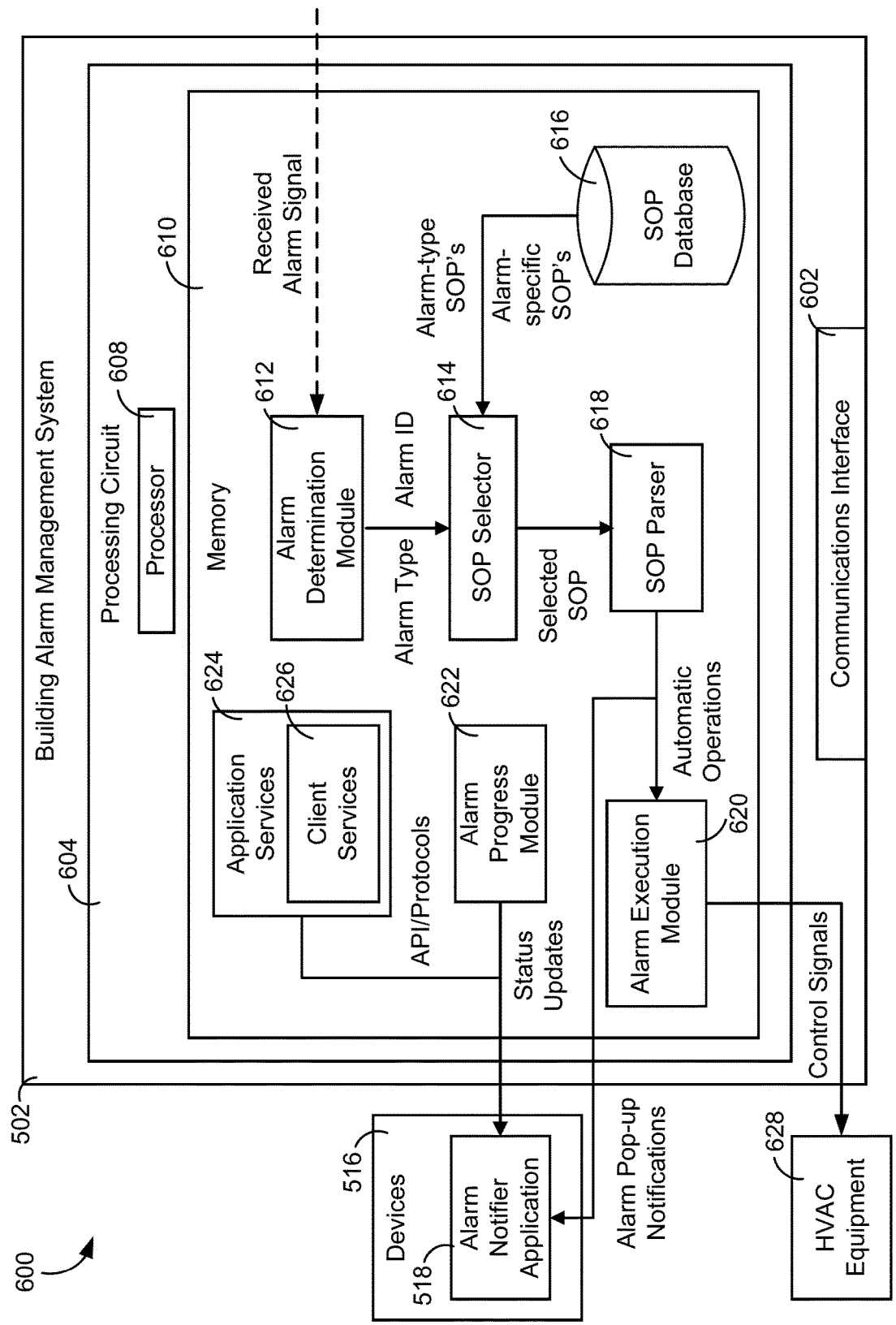

FIG. 11

BUILDING ALARM MANAGEMENT SYSTEM WITH INTEGRATED OPERATING PROCEDURES

CROSS-REFERENCE TO RELATED PATENT APPLICATION

This application claims the benefit of and priority to Indian Provisional Patent Application No. 201911003308 filed Jan. 28, 2019, the entire disclosure of which is incorporated by reference herein.

BACKGROUND

The present disclosure relates generally to a building management system (BMS). The present disclosure relates more particularly to a BMS with integrated standard operating procedures for viewing a step-by-step procedure to respond to and clear building alarms.

A BMS can be a system that includes multiple controllers, servers, and databases that can operate to control one or more systems of a building. The BMS can control building equipment such as security systems, lighting systems, heating ventilation and air conditioning (HVAC) systems, and other systems in the building. In some embodiments, the BMS communicates with the building equipment via internet protocols or building protocols such as Modus or BACnet. In a building with a BMS, the BMS may receive data from the one or more systems of the building that it uses to trigger alarms. The alarms may indicate various issues regarding the BMS, such as certain HVAC equipment malfunctioning. Further, the alarms may indicate that there is a situation in the building that needs to be addressed, such as a building fire, overheating within a server room, or a burst chiller pipe.

Typically, alarm notification regarding the BMS are displayed to a user (e.g., HVAC operator, alarm message operator, technician, etc.) via a user interface, generally through a pop-up window on a user interface. The user then performs a set of procedures (i.e., standard operating procedures (SOP)) to mitigate the issue or emergency indicated by the alarm. However, this process lacks an integration of the standard operating procedures to the BMS. Accordingly, there is exists a need to integrate the SOP to the BMS

SUMMARY

One implementation of the present disclosure is a method for automatically managing and responding to alarms in a building management system. The method includes obtaining an operating procedure comprising a set of action items to be performed in response to an alarm in the building management system. The method further includes determining, for an action item of the set of action items, whether the action item is capable of being performed automatically by the building management system or whether the action item requires user involvement. The method further includes in response to determining that the action item is capable of being performed automatically, automatically performing the action item by the building management system. The method further includes in response to determining that the action item requires user involvement, providing the action item to a user device for action by a user.

In some embodiments, obtaining an operating procedure further includes receiving the alarm in the building management system and selecting the operating procedure from a plurality of stored operating procedures based on attributes of the alarm comprising at least one of a type of the alarm, a criticality of the alarm or an origin of the alarm.

In some embodiments, determining whether the action item is capable of being performed automatically includes assigning an indicator to the action item based on capabilities of the building management system, wherein the indicator indicates whether the action item is capable of being performed automatically by the building management system or whether the action item requires user involvement.

In some embodiments, determining whether the action item is capable of being performed automatically includes determining, based on the action item, a capability of the building management system required to perform the action item and determining whether one or more components within the building management system have the capability.

In some embodiments, providing the action item to the user device for action by the user includes determining, based on the action item, one or more user attributes required for the user to handle the action item, the user attributes comprising at least one of j ob title, capabilities, knowledge, expertise, or permissions and selecting the user from a plurality of users in response to determining that the user has one or more of the attributes.

In some embodiments, the action item is a first action item, the method further includes tracking a completion status of the first action item, identifying a second action item in the set of action items to which the first action item is a prerequisite, delaying starting the second action item until the completion status of the first action item indicates that the first action item is complete in response to identifying the first action item as a prerequisite to the second action item.

In some embodiments, the method further includes automatically generating a plurality of notifications indicating a progress on a completion of the action item. The method further includes receiving locations for a plurality of user devices, the user devices comprising one or more building operator devices. The method further includes transmitting a first notification of the plurality of notifications to the plurality of user devices and transmitting a second notification of the plurality of notifications to the one or more building operator devices, the second notification comprising instructions for a user to complete the action item.

Another implementation of the present disclosure is a building management system for automatically managing and responding to alarms. The system includes a processing circuit including one or more processors and memory. The memory stores instructions that, when executed by the one or more processors, cause the one or more processors to perform operations. The operations include obtaining an operating procedure comprising a set of action items to be performed in response to an alarm in the building management system. The operations further include determining, for an action item of the set of action items, whether the action item is capable of being performed automatically by the building management system or whether the action item requires user involvement. The operations further include in response to determining that the action item is capable of being performed automatically, automatically performing the action item by the building management system. The operations further include in response to determining that the action item requires user involvement, providing the action item to a user device for action by a user.

In some embodiments, obtaining an operating procedure further includes receiving the alarm in the building management system and selecting the operating procedure from a plurality of stored operating procedures based on attributes of the alarm comprising at least one of a type of the alarm, a criticality of the alarm or an origin of the alarm.

In some embodiments, determining whether the action item is capable of being performed automatically further includes assigning an indicator to the action item based on capabilities of the building management system, wherein the indicator indicates whether the action item is capable of being performed automatically by the building management system or whether the action item requires user involvement.

In some embodiments, determining whether the action item is capable of being performed automatically includes determining, based on the action item, a capability of the building management system required to perform the action item and determining whether one or more components within the building management system have the capability.

In some embodiments, providing the action item to a user device for completion by a user further includes determining, based on the action item, one or more user attributes required for the user to handle the action item, the user attributes comprising at least one of job title, capabilities, knowledge, expertise, or permissions and selecting the user from a plurality of users in response to determining that the user has one or more of the attributes.

In some embodiments, the processing circuit is further configured to track a completion status of the first action item. The processing is further configured to identify a second action item in the set of action items to which the first action item is a prerequisite and delay starting the second action item until the completion status of the first action item indicates that the first action item is complete in response to identifying the first action item as a prerequisite to the second action item.

In some embodiments, the processing circuit is further configured to automatically generate a plurality of notifications indicating a progress on a completion of the action item and receive locations for a plurality of user devices, the user devices comprising one or more building operator devices. The processing circuit is further configured to transmit a first notification of the plurality of notifications to the plurality of user devices and transmit a second notification of the plurality of notifications to the one or more building operator devices, the second notification comprising instructions for a user to complete the action item.

Another implementation of the present disclosure is a building management system device for automatically managing and responding to alarms. The system includes a processing circuit including one or more processors and memory. The memory stores instructions that, when executed by the one or more processors, cause the one or more processors to perform operations. The operations include obtaining an operating procedure comprising a set of action items to be performed in response to an alarm. The operations further include determining, for an action item of the set of action items, whether the action item is capable of being performed automatically or whether the action item requires user involvement. The operations further include in response to determining that the action item is capable of being performed automatically, automatically performing the action item. The operations further include in response to determining that the action item requires user involvement, providing the action item to a user device for completion by a user.

In some embodiments, obtaining an operating procedure further includes receiving the alarm in the building management system and selecting the operating procedure from a plurality of stored operating procedures based on attributes of the alarm comprising at least one of a type of the alarm, a criticality of the alarm or an origin of the alarm.

In some embodiments, determining whether the action item is capable of being performed automatically further includes assigning an indicator to the action item based on capabilities of the building management system, wherein the indicator indicates whether the action item is capable of being performed automatically by the building management system or whether the action item requires user involvement.

In some embodiments, determining whether the action item is capable of being performed automatically includes determining, based on the action item, a capability of the building management system required to perform the action item and determining whether one or more components within the building management system have the capability.

In some embodiments, providing the action item to a user device for completion by a user further includes determining, based on the action item, one or more user attributes required for the user to handle the action item, the user attributes comprising at least one of job title, capabilities, knowledge, expertise, or permissions and selecting the user from a plurality of users in response to determining that the user has one or more of the attributes.

In some embodiments, the processing circuit is further configured to track a completion status of the first action item. The processing is further configured to identify a second action item in the set of action items to which the first action item is a prerequisite and delay starting the second action item until the completion status of the first action item indicates that the first action item is complete in response to identifying the first action item as a prerequisite to the second action item.

In some embodiments, the processing circuit is further configured to automatically generate a plurality of notifications indicating a progress on a completion of the action item and receive locations for a plurality of user devices, the user devices comprising one or more building operator devices. The processing circuit is further configured to transmit a first notification of the plurality of notifications to the plurality of user devices and transmit a second notification of the plurality of notifications to the one or more building operator devices, the second notification comprising instructions for a user to complete the action item.

BRIEF DESCRIPTION OF THE DRAWINGS

FIG. 6A is a block diagram illustrating the building alarm management system of FIG. 5 in greater detail, according to an exemplary embodiment.

FIG. 11 is a drawing of an alarm event interface with a standard operating procedure, which can be generated by the building alarm management system of FIG. 5, according to an exemplary embodiment.

DETAILED DESCRIPTION

Overview

Referring generally to the FIGURES, a building alarm management system (BMS) with integrated standard operating procedures (SOP) and components thereof are shown, according to various exemplary embodiments. The BMS can receive alarms from various building systems (e.g., a fire detection and alarm system, an access control system, a building management system, etc.) and send alarm notifications to various devices. The devices can run an alarm notifier application that allows a user to interact with BMS. The BMS system provides a standard operating procedure for each generated alarm that provides steps as to how the generated alarm can be managed and further provides real-time progress updates relating to the alarm management.

The alarm notifier application can receive alarm notifications from the building alarm management system (e.g., push notifications via data messaging) and can provide the user with various options for viewing alarms, responding to alarms, and customizing the alarm notifications. The alarm notifier application can provide the user with a corresponding integrated SOP based on the specific alarm raised. The SOP can provide the user with step-by-step instructions as to how the alarm can be resolved.

In some embodiments, the BMS includes an integrated automated standard operating procedure (SOP) for an alarm management system which will make the standard operating procedures a part of building management system itself. Along with the alarm popup we will now also have steps that need to be followed for its resolution. It will provide a single solution for end to end alarm management. From alarm generation, to its solution and also capturing the steps performed for resolution with detailed log. This integrated solution also provides the real-time progress report which would help in many ways like regularly notifying the BMS operator about the current progress, real time escalation based on the defined SLAs, dependency management and easier handover during shift change etc. Furthermore, there would be an option for customizing the Standard Operating Procedure (SOP) through configuration tools and defining the SLA's as per organization standards. These are explained further by help of two real-time use cases in the next slides.

Building Automation System and HVAC System

Figure 1:
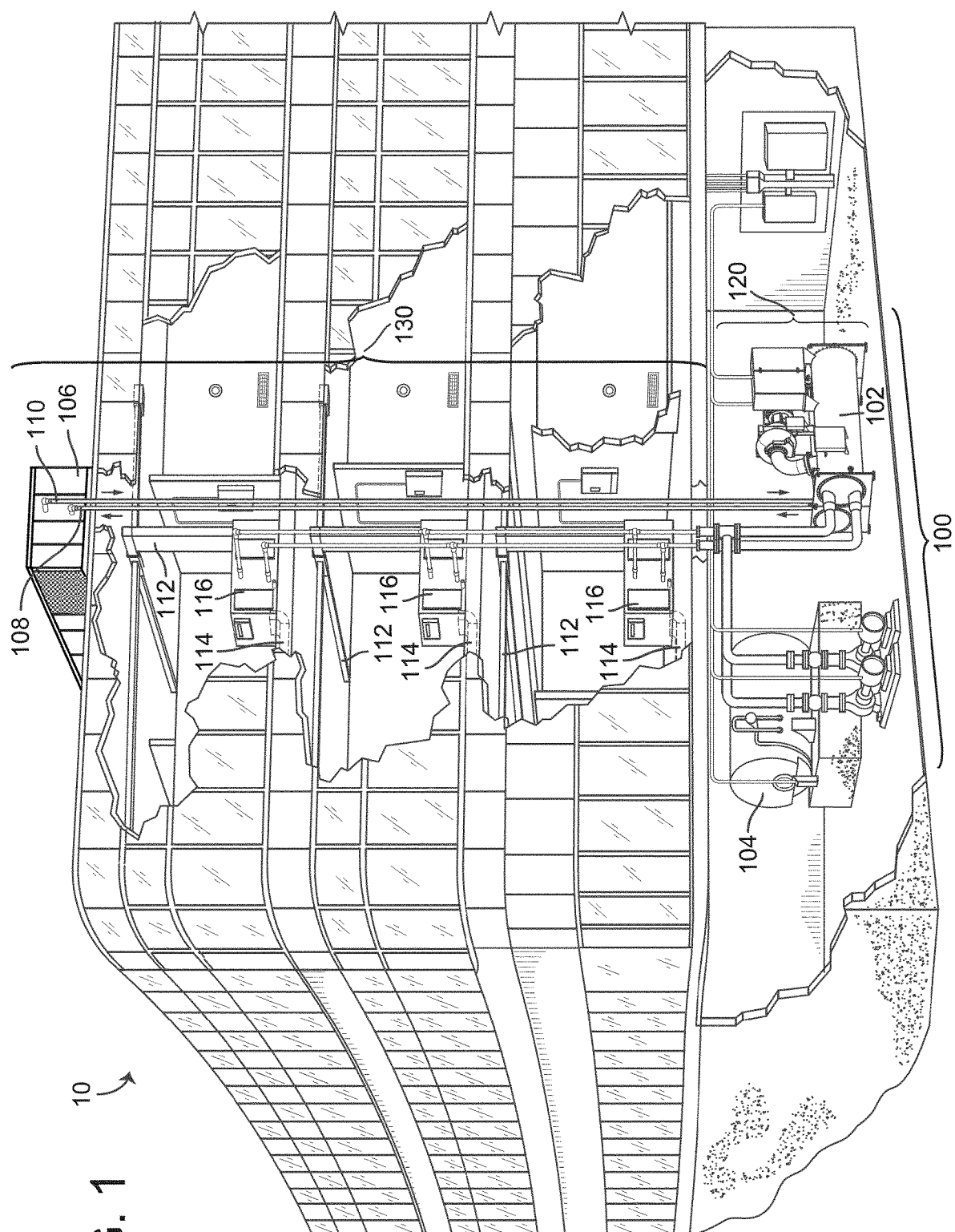
FIG. 1 is a drawing of a building equipped with a HVAC system, according to an exemplary embodiment.

Referring now to FIGS. 1-4, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alarming system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
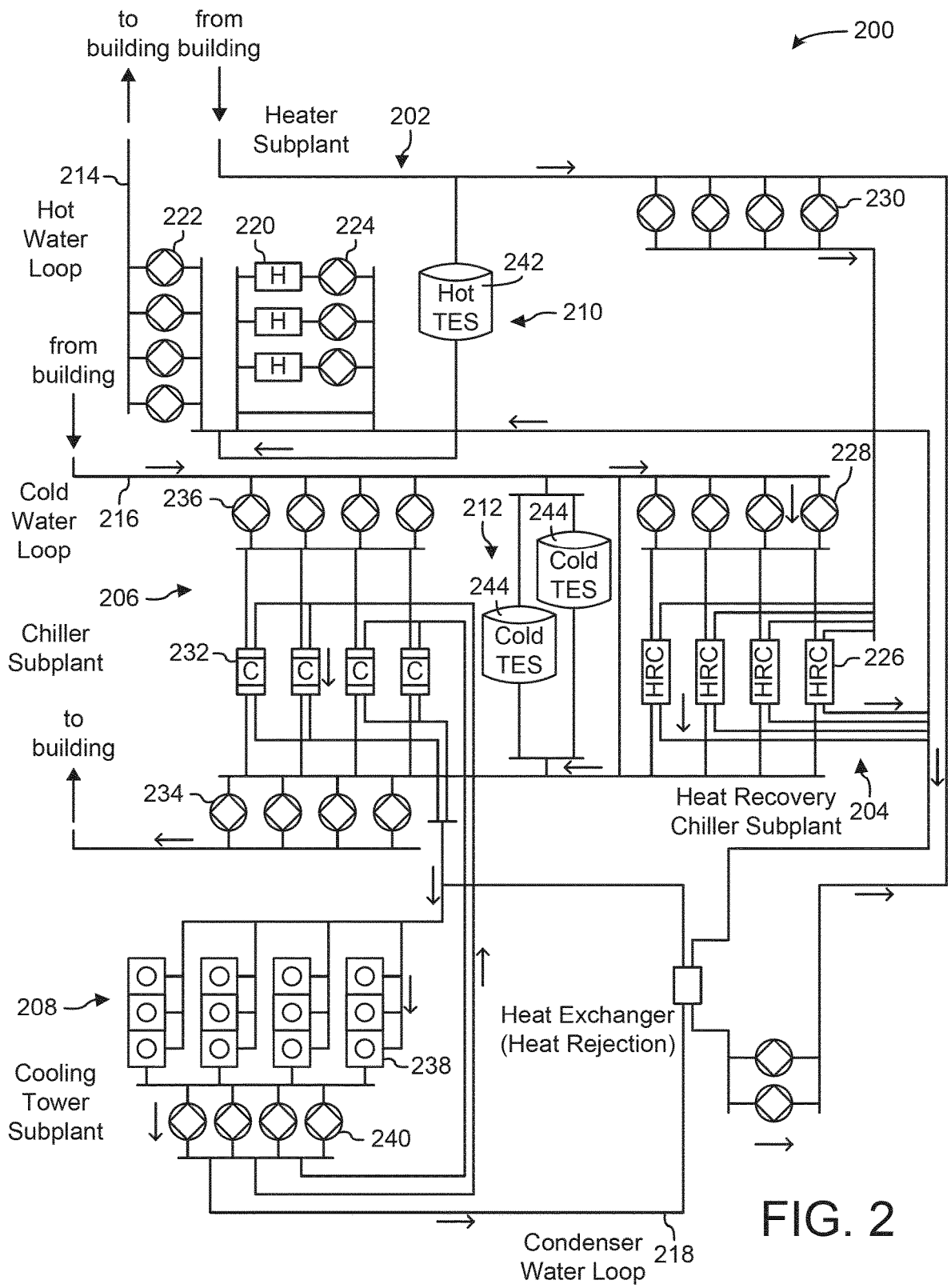
FIG. 2 is a block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
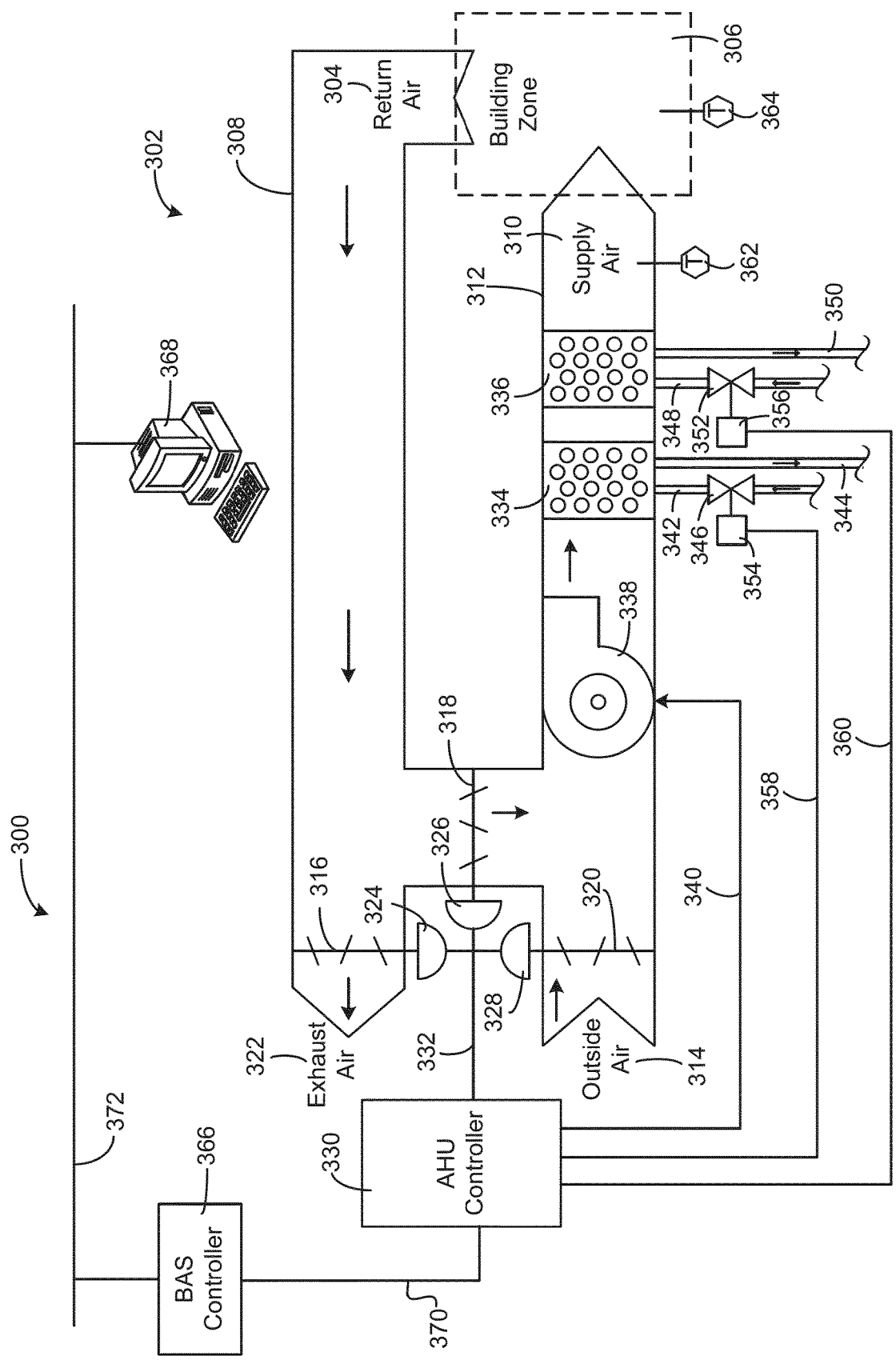
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
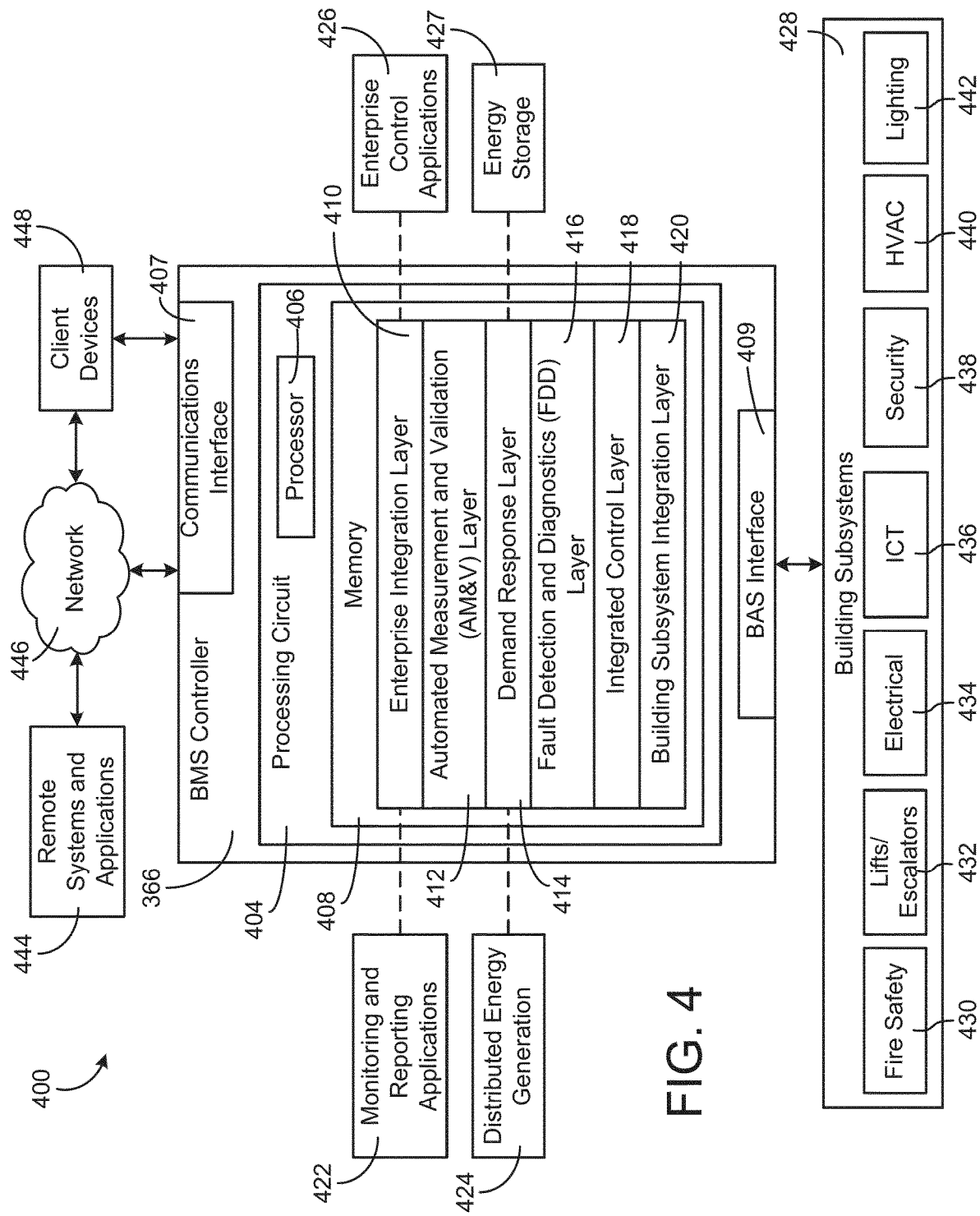
FIG. 4 is a block diagram of a building management system (BMS) that may be used to monitor and/or control the building of FIG. 1, according to an exemplary embodiment.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Building Alarm Management System

Figure 5:
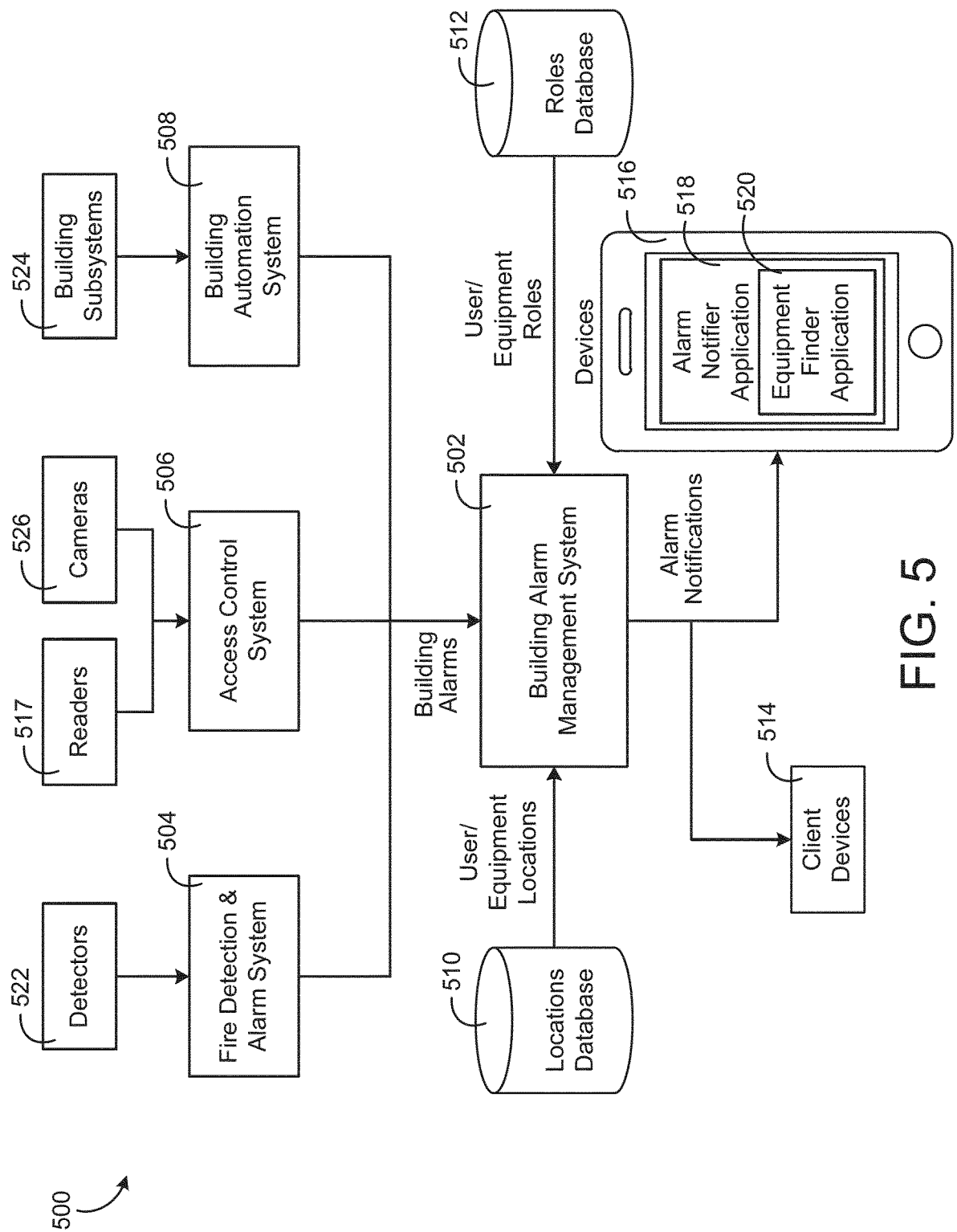
FIG. 5 is a block diagram of a building alarm management system that can be used in the BMS of FIG. 4, according to an exemplary embodiment.

Referring now to FIG. 5, a block diagram of a system 500 including a building alarm management system 502 is shown, according to an exemplary embodiment. System 500 may be incorporated partially or entirely within system 400. System 500 is shown to include building alarm management system 502, fire detection and alarm system 504, access control system 506, building automation system 508, locations database 510, roles database 512, client devices 514, devices 516, readers 517, detectors 522, building subsystems 524, and cameras 526. System 500 (and similarly system 400) may include all of the equipment and controllers used within building 10, including all of the user devices, cloud-level servers, external systems or devices, or any other component that could conceivably help execute a standard operating procedure.

Building alarm management system 502 may be configured to receive alarms from various building systems (e.g., building subsystems 524, etc.). For example, building alarm management system 502 receives alarms from fire detection and alarm system 504, an access control system 506, and a building management system 508. In some embodiments, various alarms received by building alarm management system 502 (referred to herein as "the alarms") include building equipment alarms, fault detection alarms, security alarms, fire alarms, intruder alarms, or other types of alarms or notifications.

In some embodiments, the alarms received by building alarm management system 502 can be received over various methods of transmission (e.g., Ethernet, LAN networks, Wi-Fi, BACnet, etc.). In some embodiments, the alarms are received in a format specific to the system or device providing the alarm. For example, alarms from the fire detection and alarm system 504 can be received in a format specific to the fire detection and alarm system 504. In such an example a fire detection device (e.g., wall-mounted fire notification device) may provide an alarm signal over BACnet to building alarm management system 502. Building alarm management system 502 may include communication processing capable of receiving alarm signals over BACnet and makes control decisions based on the transmitted alarm signal. The alarms can be alarms received by fire detection and alarm system 504 from detectors 522 (e.g., smoke detectors, air quality detectors, etc.). Similarly, alarms from the access control system 506 and building management system 508 can be received in formats specific to the access control system 506 and building management system 508. In various embodiments, alarms are automatically generated by various systems or devices within system 500 (e.g., from building subsystems 524, etc.), manually provided by users, or otherwise submitted to the building alarm management system 502.

Fire detection and alarm system 504 may be configured to provide alarms indicative of fires or other temperature-related alarms to building alarm management system 502. For example, a fire may be present within a room of building 10. Fire detection and alarm system 504 may receive temperature measurements from various sensors (e.g., detectors 522) and, in response to determining that the temperature measurements are high enough to indicate a fire or other temperature emergency, provide an alarm signal to building alarm management system 502.

Detectors 522 may include various environmental sensors (e.g., temperature sensors, flow sensors, etc.), fire notification devices, or fire and/or temperature related devices. Detectors 522 may be configured to provide various environmental data to fire detection and alarm system 504. For example, detectors 522 may include a temperature sensor that provides an abnormally high temperature measurement to fire detection and alarm system 504. Fire detection and alarm system 504 may then determine that the measurement is indicative of a fire and provide an alarm signal to building alarm management system 502.

Access control system 506 may be configured to receive information relating to access into or around building 10 (e.g., access via swipe cards from employees, etc.) and provide alarm signals to building alarm management system 502. For example, access control system 506 may receive a signal that indicates an authorized user has attempted to access a door into building 10 several times (e.g., 5 or more times). Access control system 506 may then provide an alarm signal to building alarm management system 502 indicative of the situation with the unauthorized user.

Readers 517 may include various card readers (smart card readers, magnetic card readers, cardkey readers, etc.) and may be any data input device that reads data from a card-shaped storage medium. In some embodiments, various employees and other authorized users use a building keycard to access building 10. Readers 517 may determine, via interaction with various building key-cards, whether a user is authorized to enter building 10. In some embodiments, readers 517 determines that a user is not authorized to enter building 10 after the unauthorized user interacts with a reader 517. Upon determining that the user is not authorized, reader 517 provides access control system 506 with a signal indicating an unauthorized user is attempting to access building 10.

Cameras 526 may include any optical instrument used to monitor and/or record images, audio, or any combination thereof. Cameras 526 may include various security cameras for building 10 configured to monitor the interior or exterior of building 10 for security purposes. In some embodiments, cameras 526 record video/audio of a security concern, such as an unauthorized user breaking in to a restricted location of building 10. Cameras 526 may then provide a signal to access control system 506 indicating the break-in into the restricted location. Access control system 506 may then provide an alarm signal to building alarm management system 502 indicating that a security concern is occurring in the restricted location.

Building management system 508 may be configured to receive updates, operational data, and various other information relating to the operation of building subsystems 524. In some embodiments, building subsystems 524 is identical or substantially similar to building subsystems 428 as described above with reference to FIG. 4. In some embodiments, building management system 508 may receive operational data about lighting subsystem 442 that indicates several lights within a building zone of building 10 are malfunctioning (e.g., broken, burned out, etc.). Building management system 508 may then provide an alarm signal to building alarm management system 502 indicating that a lighting concern is occurring within lighting subsystem 442. Various other systems apart from fire detection alarm system 504, access control system 506, and building management system 508 may provide alarm notifications to building alarm management system 502 and are not limited to the embodiments disclosed herein.

Locations database 510 may be configured to provide user/equipment locations to building alarm management system 502, as shown in FIG. 5. In some embodiments, the building alarm management system 502 can access a locations database 510 to identify user and equipment locations. Locations database 510 can be any type of information storage (e.g., server, FTP server, database server, etc.) located either on-premises (e.g., on a server within building 10, located on premises, etc.) or off-premises (e.g., SaaS, cloud storage, located off premises, etc.). Locations database 510 can be populated with location information about building 10 that specifies the location of, for example, each user and device within building 10. In some embodiments, building alarm management system 502 automatically identifies user and equipment locations using information received from access control system 506 (e.g., badge scans from readers 517, camera images/video from cameras 526, etc.), mobile devices (e.g., cellphones, personal computers, tablets, nearby Wi-Fi access points, etc.), building equipment, or other devices capable of measuring and/or reporting location information. Various techniques for automatically determining user locations and equipment locations are described in detail in U.S. patent application Ser. No. 15/586,228 filed May 3, 2017 titled "Building Alarm Management System With Mobile Device Notifications," the entire disclosure of which is incorporated by reference herein.

Roles database 512 may be configured to provide the various user/equipment roles to building alarm management system 502. In some embodiments, building alarm management system 502 can further access a roles database 512 to identify user and equipment roles. Roles database 512 can be any type of information storage (e.g., server, FTP server, database server, etc.) located either on-premises (e.g., on a server within building 10, located on premises, etc.) or off-premises (e.g., SaaS, cloud storage, located off premises, etc.). The roles database 512 may be populated with role information that specifies the responsibilities, permissions, functions, or other attributes of various users and equipment within system 500. For example, the roles database 512 can identify a user's job description (e.g., security guard, maintenance worker, technical support, etc.), group membership (e.g., member of research team, member of security personnel, etc.), special skills (e.g., trained in first aid or CPR, fluent in Russian, etc.), or other attributes that describe the function or capabilities of the user. The roles database 512 can also identify the functions or capabilities of building equipment. For example, the roles database 512 can indicate that a particular air handling unit is capable of providing airflow to a room or zone of the building.

Client devices 514 may be configured to receive alarm notifications from building alarm management system 502. Client devices 514 may be identical or substantially similar to client devices 448 as described above. Devices 516 is shown to include alarm notifier application 518 and equipment finder application 520. Devices 516 may include various handheld communication devices (e.g., smartphones, personal computers, tablets, HVAC tablets, etc.) configured to communicate with building alarm management system 502.

In some embodiments, devices 516 are the building management devices that BMS operators use to facilitate and/or manage building operations, including monitoring SOP's. For example, a BMS operator may sit at a desktop computer that is connected to the BMS network 446 via Ethernet connection, allowing the BMS operator to interact with BMS operations via the desktop computer. BMS operator may further receive alarm notifications from building alarm management system 502. While it is not shown in FIG. 5, devices 516 may refer to a desktop device rather than a smartphone or other device, such as depicted in FIG. 5.

In some embodiments, devices 516 are mobile devices (e.g., smartphones, tablets, etc.) that may be operated by BMS operators and/or BMS technicians. BMS operators may be able to monitor and/or control building operations via the mobile device 516. In other embodiments, BMS operators and/or technicians may be able to send updates (e.g., notifications, task updates, etc.) via a mobile device 516 to another device within the BMS responsible for monitoring building operations. For example, a BMS operator may receive, via a BMS desktop device 516, a notification that there is a broken light in building zone 2-A. The BMS operator may then send a technician to fix the light. Once the task is complete, the technician may transmit, via his/her device 516, a status update regarding the task to the BMS desktop device 516 to update the BMS operator.

Alarm notifier application 518 may be configured to receive (e.g., via Wi-Fi, LAN, etc.) an alarm notification, process the alarm notification signal, and generate, on the user interface of the device 516, a notification of the alarm. Alarm notifier application 518 may receive alarm notifications (e.g., push notifications via data messaging) from building alarm management system 502 and can provide users (e.g., operators of client devices 514 or device 516) with various options for viewing alarms, responding to alarms, and customizing the alarm notifications. The alarm notifier application 518 allows a user to view alarms for specific buildings and filter the alarms by various categories or attributes (e.g., time, alarm type, equipment type, severity, etc.). In some embodiments, the alarm notifier application 518 allows push notifications to be enabled/disabled for various alarm categories to provide flexibility in the types of notifications provided to the user.

Equipment finder application 520 may be configured to provide, via the user interface on devices 516, the various equipment names and/or locations for the alarm is for. For example, device 516 receives an alarm notification indicating a fire has occurred within the boiler room of building 10. Equipment finder application 520 may then provide the user with the devices near the boiler room of building 10 and/or their respective locations. In some embodiments, equipment finder application 520 takes into account the location of the user of device 516 to provide an optimal alarm notification. In some embodiments, equipment finder application 520 may allow a user to view the locations of various pieces of equipment for a building based on equipment data received from the building alarm management system 502. In other embodiments, the equipment finder application 520 may be a separate application from the alarm notifier application 518 or may be integrated with the alarm notifier application 518.

Client devices 514 and devices 516 may receive alarm notifications from building alarm management system 502. For example, a security alarm received from the access control system 506 may indicate that an unauthorized entry occurred a particular location within building 10. Building alarm management system 502 may then send a customized notification to the mobile device (e.g., device 516) of one or more security personnel (e.g., users identified as having the "security personnel" role) with specific instructions for handling the security alarm. The alarm notification provided to each of the security personnel may be based on the locations of the security personnel relative to the location of the alarm (i.e., the location at which the unauthorized entry occurred). For example, security personnel located close to the alarm location may receive a first set of instructions, whereas security personnel located further from the alarm location may receive a second set of instructions.

In another example, a security alarm received from the access control system 506 may indicate that an unauthorized entry occurred a particular location within building 10. Building alarm management system 502 may then send a customized notification to a central building controller (e.g., BMS controller 366) to automatically implement various standard operating procedures, such as sending a customized notification to one or more security personnel (e.g., users identified as having the "security personnel" role) with specific instructions for handling the security alarm.

Figure 6B:
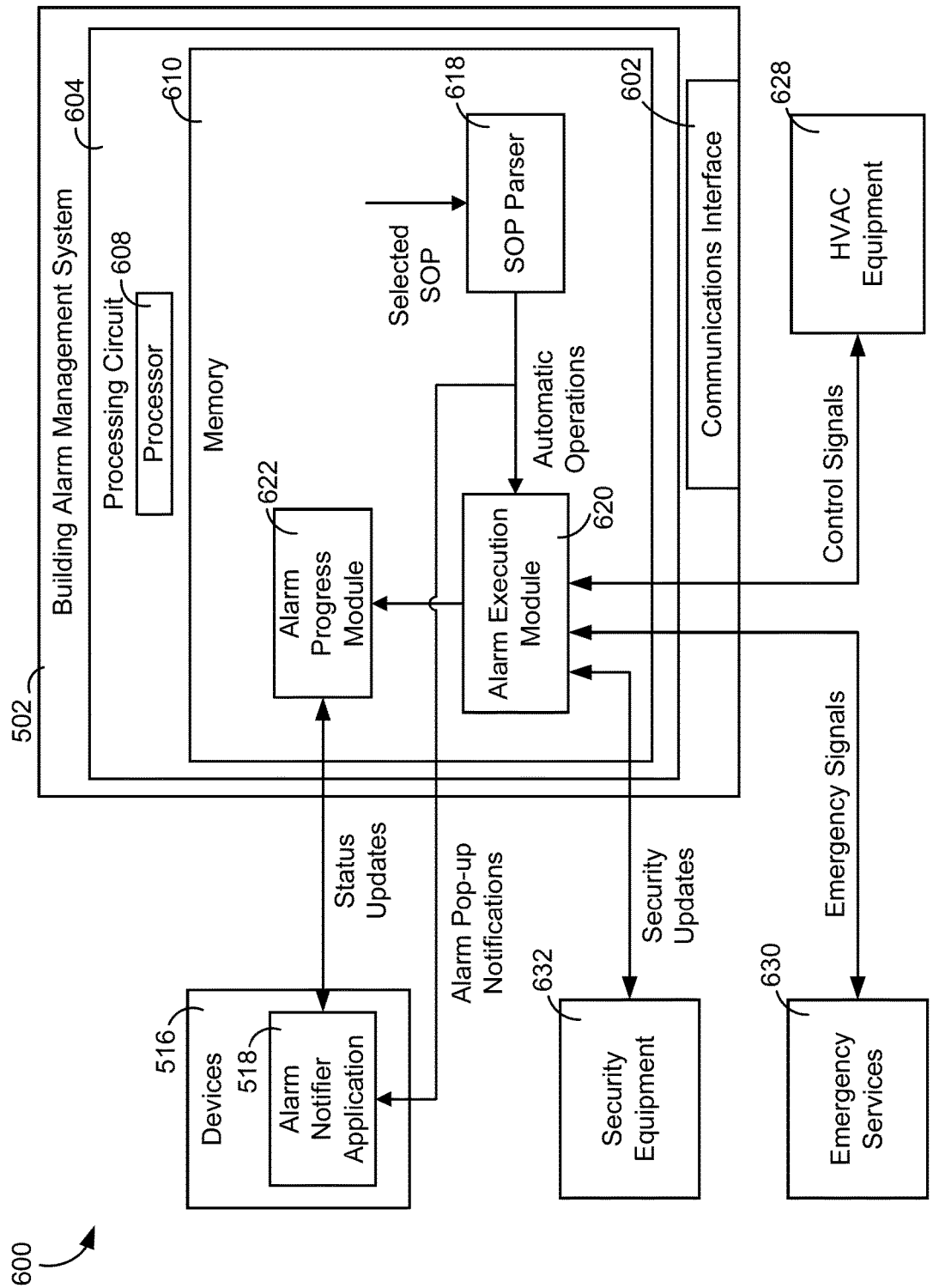
FIG. 6B is a block diagram illustrating the building alarm management system of FIG. 5 automatically managing alarms, according to an exemplary embodiment.

Referring now to FIG. 6A, a block diagram illustrating the building alarm management system 502 in greater detail is shown, according to an exemplary embodiment. The building alarm management system 502 is shown to include a communications interface 602 and a processing circuit 604.

Communications interface 602 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interface 602 can be direct (e.g., local wired or wireless communications) or via a communications network 446 (e.g., a WAN, the Internet, a cellular network, etc.). For example, interface 602 can include an Ethernet card and port for sending and receiving data via an Ethernet-based communications link or network. In another example, interfaces 602 can include a Wi-Fi transceiver for communicating via a wireless communications network. In another example, interface 602 can include cellular or mobile phone communications transceivers. In one embodiment, communications interface 602 is a power line communications interface. In some embodiments, communications interface 602 can be configured to communicate via local area networks (e.g., a building LAN), wide area networks (e.g., the Internet, a cellular network, etc.), and/or conduct direct communications (e.g., NFC, Bluetooth, etc.). In some embodiments, communications interface 602 includes an application gateway configured to receive input from applications running on client devices. For example, the communications interface can include one or more wireless transceivers (e.g., a Wi-Fi transceiver, a Bluetooth transceiver, a NFC transceiver, a cellular transceiver, etc.) for communicating with devices 606.

The processing circuit 604 is shown to include a processor 608 and memory 610. The processor 608 can be a general purpose or specific purpose processor, an application specific integrated circuit (ASIC), one or more field programmable gate arrays (FPGAs), a group of processing components, or other suitable processing components. The processor 608 is configured to execute computer code or instructions stored in memory or received from other computer readable media (e.g., CDROM, network storage, a remote server, etc.).

Memory 610 can include one or more devices (e.g., memory units, memory devices, storage devices, etc.) for storing data and/or computer code for completing and/or facilitating the various processes described in the present disclosure. Memory 610 can include random access memory (RAM), read-only memory (ROM), hard drive storage, temporary storage, non-volatile memory, flash memory, optical memory, or any other suitable memory for storing software objects and/or computer instructions. The memory 610 can include database components, object code components, script components, or any other type of information structure for supporting the various activities and information structures described in the present disclosure. Memory 610 can be communicably connected to the processor 608 via the processing circuit 604 and can include computer code for executing (e.g., by the processor 608) one or more processes described herein. When the processor 608 executes instructions stored in memory 610, the processor 608 generally configures the building alarm management system 502 (and more particularly the processing circuit 604) to complete such activities.

Still referring to FIG. 6A, memory 610 is shown to include alarm determination module 612, standard operating procedure (SOP) selector 614, SOP database 616, SOP parser 618, alarm notification module 620, alarm progress module 622, application services 624, and client services 626. Building alarm management system may include more or less components shown within memory 610 and is not limited to the embodiments disclosed herein.

Alarm determination module 612 can be configured to determine the location and type of alarm in conjunction with alarm systems, including fire detection and alarm system 504, access control system 506, and building management system 508. For example, alarm determination module 612 may process information provided by the access control system 506 and determine that the alarm is an unauthorized entry occurring in a particular location of building 10. The alarm may be received be fire detection and alarm system 504 from detectors 522 (e.g., smoke detectors, air quality detectors, etc.), by access control system 506, or by building management system 508. In some embodiments, alarm determination module 612 may automatically determine information regarding the alarm and will produce a name for the raised alarm.

SOP selector 614 may be configured to provide a SOP for the raised alarm, based on the information determined from alarm determination module 612. SOP selector 614 is shown to access SOP database 616. SOP database 616 can be populated with SOP information that specifies various step-by-step processes and responsibilities, permissions, functions, or other attributes of various personal who may be responsible for resolving the alarms. For example, in the case of a fire alarm from fire detection and alarm system 504, the SOP database 616 may identify a fire alarm SOP that includes steps such as informing the fire department, visiting the location of the fire alarm, informing a response team about the alarm, evacuating the building, etc. In some embodiments, SOP retrieved from SOP database 616 may comprise a checklist of step-by-step instructions for resolving the alarm. The SOP may be followed by a BMS operator, an HVAC technician, an emergency response team, a security team of the building, or any other personnel who may be associated with alarms generated within the building. Each SOP from the SOP database 616 may have a corresponding user who is responsible for following the SOP according to the type of alarm which was raised. For example, if the alarm was raised due to a malfunction with the HVAC equipment, the SOP may correspond to an HVAC technician. In some embodiments, the SOP may comprise an interactive process, such that each step can be checked off by the user as it is completed. The process in following SOP may then be updated in real-time via alarm progress module 622. Several SOP examples that may be selected by SOP selector 614 are described below.

In some embodiments, each SOP may correspond to a single alarm and is retrieved from SOP database 616 when that specific alarm is raised. In other embodiments, one or more of the SOPs stored in SOP database 616 may be generally applicable to all alarms of a given type (e.g., based on the type of equipment or space associated with the alarm, based on the type of problem the alarm describes, etc.) such that the same SOP could be used for multiple alarms of that same type. For example, alarm determination module 612 may determine that an alarm from fire detection and alarm system 504 is both related to fire (i.e., alarm type) and indicating exceedingly high temperatures in the server room of building zone A (i.e., alarm ID). SOP database 616 may provide some or all standard operating procedures based on the type of alarm (e.g., a fire alarm). Additionally, SOP database 616 may provide some or all standard operating procedures based on the specific identification of the alarm. In the above example, the SOP received for the sever room of building zone A may include (1) type-based SOP components, such as alerting the emergency services that there is a fire within the building and (2) ID-based SOP components, such as cutting power to the servers within building zone A and engaging the sprinkler system in building zone A.

In some embodiments, the SOP includes aspects of both (1) procedures that can be automated by building alarm management system 502 and (2) aspects that require manual procedures that may be performed by an operator. In various embodiments, the SOP includes "action items" which may refer to various control decisions, setpoints, commands, or any other action that can be performed in response to receiving the alarms. The action items may be completely performed by building management system 502, completely performed manually by an operator, of a combination of both.

In a first example, building alarm management system 502 receives an alarm signal from fire detection and alarm system 504 indicating that a fire has occurred in a particular building zone of building 10. In response to receiving the alarm signal, SOP selector 614 selects an SOP created for this alarm situation. The SOP may include the following steps:

1. Receive an alarm signal indicating a fire has started within the on-premises server room of building 10
 2. Upon receiving the fire alarm signal, notify building occupants of the emergency situation
 3. Transmit an alert to emergency services and/or first responders
 4. Shut down various components within the affected building zone
 5. Increase HVAC pump speeds to allow for greater fire suppression
 6. Contact IT department to determine which networks are lost and, if possible, transfer stored data from endangered servers to safe and secured servers
 7. Discuss fire suppression progress with first responders and notify building management when the building is safe to operate under normal conditions
 8. Engage with the user interface from where the alarm was shown and perform the necessary tasks to complete and/or remove the alarm.

Given the above example, steps 1-5 could be operated automatically (e.g., performed by building alarm management system 502). However, steps 6-8 may need to be performed manually to optimize the success of the SOP. As such, this may be considered an example of partial integration of SOP within a BMS.

In some embodiments, the SOP includes aspects that are completely performed by building alarm management system 502. While there may be emergency situations that concern the safety of building occupants and require a human-based component (e.g., the example stated above), there may be various alarm signals generated that do not require human involvement to resolve the alarm. For example, a minor alarm from building management system 508 is received that indicates that escalators subsystem 432 has stopped working. In response to receiving the alarm signal, SOP selector 614 selects an SOP created for this alarm situation. The SOP may include the following steps:

1. Receive the alarm signal indicating an escalator has stopped working within a particular building zone of building 10
2. Transmit an alert to building occupants notifying them that the escalator is malfunctioning
3. Notify building mechanic of the alarmed situation
4. Receive notification that escalator is operating properly
5. Transmit an alert to building occupants notifying them that the escalator is back to normal operation.

These steps may be completely automated by building alarm management system 502 and is thus an example of complete integration of SOP within a BMS. Various other SOP may be considered, from complete automation to partial automation, and are not limited to the embodiments disclosed herein.

Still referring to FIG. 6A, SOP parser 618 can be configured to determine where to provide selected SOP, determined by SOP selector 614, in response to the received alarm signal. For example, SOP parser 618 may receive information from roles database 512 indicative of various user's job descriptions (e.g., security guard, maintenance worker, technical support, etc.), group membership (e.g., member of research team, member of security personnel, etc.), special skills (e.g., trained in first aid or CPR, fluent in Russian, etc.), or other attributes that describe the function or capabilities of the user. The SOP parser 618 may also receive information from locations database 510 to identify user locations within the building. The SOP parser 618 may be configured to determine which user(s) should be notified regarding the received alarm signal, and to which device the SOP should be distributed to. For example, if the raised alarm is a fire alarm from the fire detection and alarm system, the SOP parser 618 may automatically notify all users located within the building, determined by locations database 510, and instruct them to evacuate the building. In some embodiments, SOP parser 618 may automatically send the SOP selected by SOP selector 614 a BMS processing device (e.g., BMS controller 366) for automatic implementation of the SOP. In other embodiments, SOP parser 618 may also automatically send the SOP selected by SOP selector 614 to a BMS operator and/or the fire department, based on the fire alarm.

In some embodiments, SOP parser 618 can be configured to provide notifications (e.g., messages, alarms, information, etc.) to various user devices (e.g., devices 606) based on the locations of the user and/or on the roles associated with users of the devices, which may be determined by SOP parser 618. For example, if an alarm signal is received that indicates a hazardous condition (e.g., a fire, a chemical spill, a security event, etc.) within building 10, the alarm notification module 620 may send a notification to users that may be affected by the hazardous condition based on the location of the users and their associated roles. The notification can include, for example, evacuation instructions, response instructions, or other instructions for handling the hazardous condition.

In some embodiments, SOP parser 618 provides the SOP, determined by SOP selector 614, to the identified user, determined by SOP parser 618. For example, in the case of a fire alarm, the alarm notification module 620 may be configured to notify the fire department as well as to provide a BMS operator with the SOP. Alarm notification module 620 may be configured to notify the identified users via alarm notification application 518 or any other remote applications, which may operate (i.e., run) on devices 606. In some embodiments, alarm notification module 620 may provide the SOP to BMS operators, users located within the building, and the identified user for resolving the alarm. The alarm notification module 620 may provide an interactive SOP to the identified user, such that they can check steps as they are performed to resolve the alarm, which may be viewed by the BMS operator and other users to see the real-time progress of solving the alarm. For example, if the alarm is raised due to a malfunction with HVAC equipment, one step (i.e., in the SOP may be to take other HVAC equipment and devices offline in order to perform the necessary maintenance. While the SOP would be directed to an HVAC technician, other users within the building may be interested to know the real-time progress update of the SOP so they will know when the HVAC equipment can be expected to be back online and functioning properly. The other users may be unable to modify the SOP, but may generally be able to see a progress update of resolving the alarm via alarm notification application 518. The alarm progress module 622 may regularly notify, via alarm notifier application 518 a user, such as a BMS operator, about the current progress in resolving the alarm and real-time escalation based on defined service level agreements.

In another example, if a security event alarm is raised in the building (e.g., an unauthorized entry), the SOP parser 618 can send the SOP to security personnel with specific instructions for handling the security event. The SOP provided to tracked devices associated with security personnel can be based on the locations of the tracked devices with respect to the security event. For example, security personnel located close to the event may receive a first SOP, whereas security personnel located further from the event may receive a second SOP. Additionally, the SOP provided to tracked devices associated with security personnel may be different than the instructions provided to tracked devices associated with other building occupants, which may include instructions such as evacuating the building and do not necessarily help with resolving the alarm. In some embodiments, SOP parser 618 may determine the correct user for resolving the alarm based on factors such as which HVAC technician or BMS operator is on the current shift. In the event of a shift change, SOP parser 618 may automatically determine the new user associated with the alarm. Further, the building alarm management system 502 may be configured to retrieve work shift information for users and record non-critical alarms that occur outside of the working hours of users as indicated by the work shift hours. In some embodiments, the building alarm management system 502 may be configured to send the SOP to resolve the alarm to the user only once the user is within their working hours.

In some embodiments, SOP parser 618 may also be configured to automatically perform a variety of pre-requisite action items that must be accomplished before a user can follow the SOP. For example, if the raised alarm is an HVAC equipment malfunction and the SOP determined by SOP selector 614 involves changing various parts of the HVAC equipment, the alarm notification module 620 may be configured to automatically determine if the required parts are available. The alarm notification module 620 may access a parts database, which can be updated via a user on the alarm notifier application 518, in order to see if the required parts are available. In some embodiments, if additional parts are needed, the alarm notification module 620 may alert the identified user that the parts need to be obtained prior to performing the steps of the SOP. The alarm notification module 618 may also be configured to determine if any other SOP's need to be followed or performed before the user performs the selected SOP to resolve the alarm.

In some embodiments, SOP parser 618 may determine a threshold of capability for performing action items (e.g., SOP tasks, SOP steps, etc.). SOP parser 618 may then determine the capability of one or more components within building alarm management system 502 (e.g., alarm execution module 620) to determine if the component has the capability to complete the action item. For example, in response to building alarm management system 502 receiving an alarm regarding a fire in building 10, SOP parser 618, upon receiving the selected SOP, may determine if alarm execution module 620 is capable of performing a step within the selected SOP of shutting down the chillers near the fire. If alarm execution module 620 cannot perform this function, SOP parser may provide the task to a user for manual execution. However, if alarm execution module 620 can perform the function, SOP parser 618 may instruction alarm execution module 620 to complete the action item.

In some embodiments, SOP parser 618 may receive certain attributes regarding various building occupants, such as job title, capabilities, knowledge, expertise, and building permissions for a plurality of users (e.g., HVAC technicians, etc.). These attributes may be stored in one of the various databases disclosed herein (e.g., roles database, etc.) and may not be stored within building alarm management system 502. SOP parser 502 may then provide the action item to a user device (e.g., device 516) for completion by the user.

Alarm execution module 620 may be configured to execute various alarms that do not require human involvement to resolve the alarm. In some embodiments, SOP parser 618 may determine that at least some tasks within the selected SOP do not require human involvement and can thus be performed by building alarm management system 502. For example, a selected SOP may determine that emergency authorities need to be contacted. SOP parser 618 may provide alarm execution module 620 with the automatic operations that can be performed by building alarm management system 502. Alarm execution module 620 may then complete the various operations (e.g., tasks, steps, procedures, etc.) automatically and without human intervention. As shown in FIG. 6A, one or more operations that are automatically performed may be providing control signals to HVAC equipment 628 to resolve the alarm. Other examples include transmitting a signal to emergency services, updating building occupants with status updates, and sending recommendations to HVAC technicians. Various examples are described with reference to FIG. 6AB below.

Alarm progress module 622 may be configured to provide real-time progress updates (e.g., messages, alarms, information, etc.) to user devices based on the progress of resolving the alarm. The SOP presented to the determined user may be an interactive interface, which can be accessed on devices 606 via alarm notification application 518. The determined user (BMS operator, HVAC technician, security personnel, etc.) can follow the SOP and check off each step as they perform it. Alarm progress module 622 may automatically receive this feedback, from alarm notifier application 518 for example, such that building alarm management system 502 is aware of the progress of resolving the alarm. Additionally, building alarm management system 502 may automatically provide SOP updates to users via alarm progress module 622 based on information received from fire detection and alarm system 504, access control system 50, or building management system 508. IN some embodiments, alarm progress module 622 may be configured to operate in both directions, such that it provides feedback from a user to the building alarm management system 502 and provides alarm information to a user via alarm notifier application 518. In some embodiments, alarm progress module 622 may be configured to determine when the entire SOP has been completed and building alarm management system 502 may stop the alarm accordingly.

In some embodiments, alarm progress module 622 may generate, determine, and/or monitor the life cycle of the alarm. For example, alarm progress module 622 may provide the total estimated time of completion for the received alarm to alarm notifier application 518. Alarm determination module 612 may receive an alarm for repairing a malfunctioning pump in a particular building zone. After communication with the HVAC repair technician, alarm progress module 622 may provide a BMS operator using device 516 with an estimation time of 2 hours until the alarm task list is completed. In some embodiments, the generated life cycle is dynamic and can be updated periodically (e.g., every 5 seconds, every 5 minutes, etc.).

Application services 624 may be configured to provide an applications gateway for conducting electronic data communications. For example, application services 624 can be configured to receive communications from the devices 516 and/or building equipment. Communications can include detected emitter identifiers, GPS data, altimeter data, accelerometer data, and/or other data from mobile devices and/or building equipment. Client services 626 can provide client devices with a graphical visualization (e.g., a three-dimensional model, an augmented reality overlay, a map, etc.) of the building with the locations of various users and devices (e.g., building equipment, mobile devices, user devices, etc.) represented in the graphical visualization (described in greater detail below).

Client services 626 may be configured to facilitate interaction and/or communication between the building alarm management system 502 and various internal or external clients or applications. For example, client services 626 can include web services or application programming interfaces available for communication by UI clients and remote applications (e.g., applications running on a mobile device, energy monitoring applications, applications allowing a user to monitor the performance of the building alarm management system 502, automated fault detection and diagnostics systems, etc.). Application services 624 may facilitate direct or indirect communications between remote applications, such as alarm notifier application 518, any local applications, and the building alarm management system 502. For example, application services 624 may allow the building alarm management system 502 to communicate (e.g., over a communications network) with alarm notifier application 518 or other remote applications running on mobile devices and/or with a BMS controller.

In some embodiments, application services 628 provide an applications gateway for conducting electronic data communications with UI clients 624. For example, application services 628 can be configured to receive communications from the mobile devices 516 and/or building equipment. Communications can include detected emitter identifiers, GPS data, altimeter data, accelerometer data, and/or other data from mobile devices and/or building equipment. Client services 626 can provide client devices with a graphical visualization (e.g., a three-dimensional model, an augmented reality overlay, a map, etc.) of the building with the locations of various users and devices (e.g., building equipment, mobile devices, user devices, etc.) represented in the graphical visualization (described in greater detail below with reference to FIGS. 8-10C).

Referring now to FIG. 6AB, another exemplary embodiment of system 600 is shown. In some embodiments, building alarm management system 502 is configured to both (1) provide one or more steps of an SOP to one or more users such that the alarms may be resolved, at least in part, manually and (2) perform various steps of an SOP such that the alarms may be resolved, at least in part, automatically. In some embodiments, FIG. 6AB discloses various automatic processes that may be controlled by building alarm management system 502 in response to receiving an alarm and selecting an SOP.

Alarm execution module 620 is shown to provide and receive security updates to security equipment 632. Security equipment 632 may be part of access control system 506 or may be a separate system. Security equipment 632 may be the various devices, equipment, and sensors implemented to provide security to building 10, such as electric door locks, card readers, cameras, or any other kind of security equipment. In some embodiments, alarm execution module with receive instructions from SOP parser 618 to perform tasks of the selected SOP. In such an even, alarm execution module 620 may automatically perform the tasks required. For example, alarm execution module 620, upon receiving instructions regarding an attempted break-in into building 10, may engage all secondary cameras to begin recording within security equipment 632 and lock all doors at the entrances of building 10. Alarm execution module 620 may also notify the authorities by sending an emergency signal to emergency services 630. These, and several other steps, may be received by alarm execution module to perform automatically. In some embodiments, all of the operations (e.g., tasks, steps, etc.) provided by SOP parser 618 can be performed by alarm execution module 620 and do not need to be sent to the user (e.g., through device 516). In other embodiments, all of the operations provided by SOP parser 618 are performed by alarm execution module 620 and notifications, updates, and progress reports are sent to the users via alarm progress module 622.

In another example, alarm execution module 620 may receive instructions from SOP parser 618 regarding a broken pump (e.g., pump 234) in waterside system 200. Both manual and automatic tasks may be completed to resolve this alarm. SOP parser 618 may send notifications to building occupants (e.g., users of devices 516) notifying them of the emergency, and updating them on the progress of resolving the alarm. Additionally, alarm execution module 620 may restrict access to the room in which the pump is located (e.g., the chiller room) to only those that may need to enter for repairing the pump (e.g., HVAC technicians). Additionally, alarm execution module may provide control signals to HVAC equipment 628 to restrict flow to the pump and disengage any HVAC equipment that may be directly or indirectly affected by the pump malfunctioning. For example, if the pump 234 as shown in FIG. 2 becomes inoperable, the SOP instructions sent to alarm execution module 620 may include shutting down chillers 232.

Methods for Automating Standard Operating Procedures

Figure 7A:
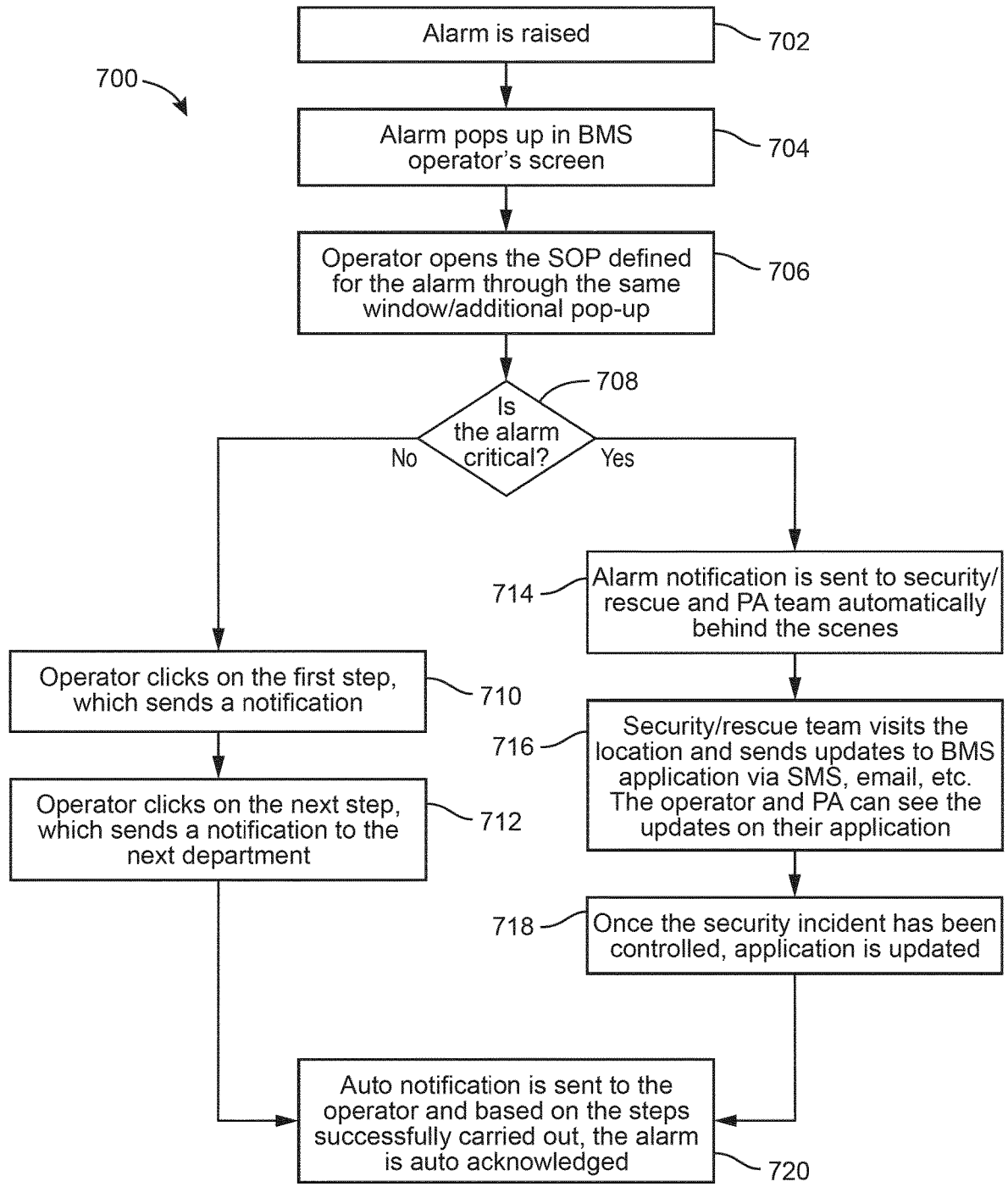
FIG. 7A is a flow diagram of a process for automatically managing alarms using the building alarm management system of FIG. 5, according to an exemplary embodiment.

Referring now to FIG. 7A, a flow diagram of a process 700 for an integrated standard operating procedure of the building alarm management system 502 is shown, according to an exemplary embodiment. In some embodiments, process 700 outlines both (1) action items taken when an alarm is determined to be a critical (e.g., dangerous, life-threatening, etc.) alarm and (2) action items taken an alarm is determined to be a non-critical alarm. In some embodiments, building alarm management system 502 is configured to perform process 700.

Process 700 is shown to include raising an alarm (step 702). In some embodiments, step 702 is performed by the various alarm systems disclosed above with reference to FIG. 5, such as fire detection and alarm system 504, access control system 506, and building management system 508. Systems 504-508 may provide alarm signals (e.g., "raise alarms") to building alarm management system 502.

Process 700 is shown to include alarms appearing in BMS operator's screen (step 704). In step 704, building alarm management system 502 can be configured to provide the particular alarm received to an indicated user (e.g., BMS operator, BMS technician, etc.) once the alarm is raised. For example, application services 624 may provide alarm notifier application 518 a pop-up window indicating the alarm received. In some embodiments, the operator may be determined by the SOP parser 618 based on the raised alarm.

Process 700 is shown to further include an operator opening the SOP defined for the alarm through the same window/additional pop-up (step 706). In step 706, the operator may open a SOP for the raised alarm through a user interface (e.g., laptop screen, desktop screen, etc.) connected to building alarm management system 502. The SOP for the particular alarm may be chosen by SOP selector 614 from SOP database 616. The selected SOP may be sent to the operator via alarm notification application 518. In some embodiments, the selected SOP may be presented to the operator in the same window of alarm notification application 518 as the raised alarm. In other embodiments, the selected SOP may be presented to the operator via an additional window or pop-up of alarm notification application 518, such that the operator can view multiple windows on alarm notification application 518.

Process 700 is shown to further include determining if the alarm is critical (step 708). In some embodiments, a critical alarm may correspond to a fire detected by detectors 522 via fire detection and alarm system 504, while a non-critical alarm may correspond to a fault in HVAC equipment (e.g., boiler 104, VAVs 116, chiller 102, AHU 106, etc.) detected by building subsystems 524 via building management system 508. In various embodiments, the criticality of an alarm may be proportional to the danger imposed by the emergency. For example, a malfunctioning light in a storage room may not be considered a critical emergency. However, malfunctioning light on a machine shop floor may be considered an emergency. In some embodiments, the operator may need to determine and select, e.g., via user device 606, whether or not the alarm is critical. If a fire alarm has been raised accidentally, such as by a faulty smoke detector, and the operator has determined that there is no real fire within the building, the operator may overrule the building management system 508 to select that the alarm is in fact not critical. In other embodiments, the decision is automatically made by the device responsible for implementing at least some action times of the SOP (e.g., building alarm management system 502).

Process 700 is shown to include an operator clicking on the first step which sends a notification (step 710). Upon determining that the alarm is not critical (e.g., "NO" to step 708), a BMS operator may provide a notification (e.g., alarm notification, alert, push notification, etc.) to various devices, such as devices 606. This may be considered a manual action item taken in the SOP, as a BMS operator is determining to transmit the notification rather than control logic within building alarm management system 502. In some embodiments, step 710 is performed automatically by building alarm management system 502.

Figure 9:
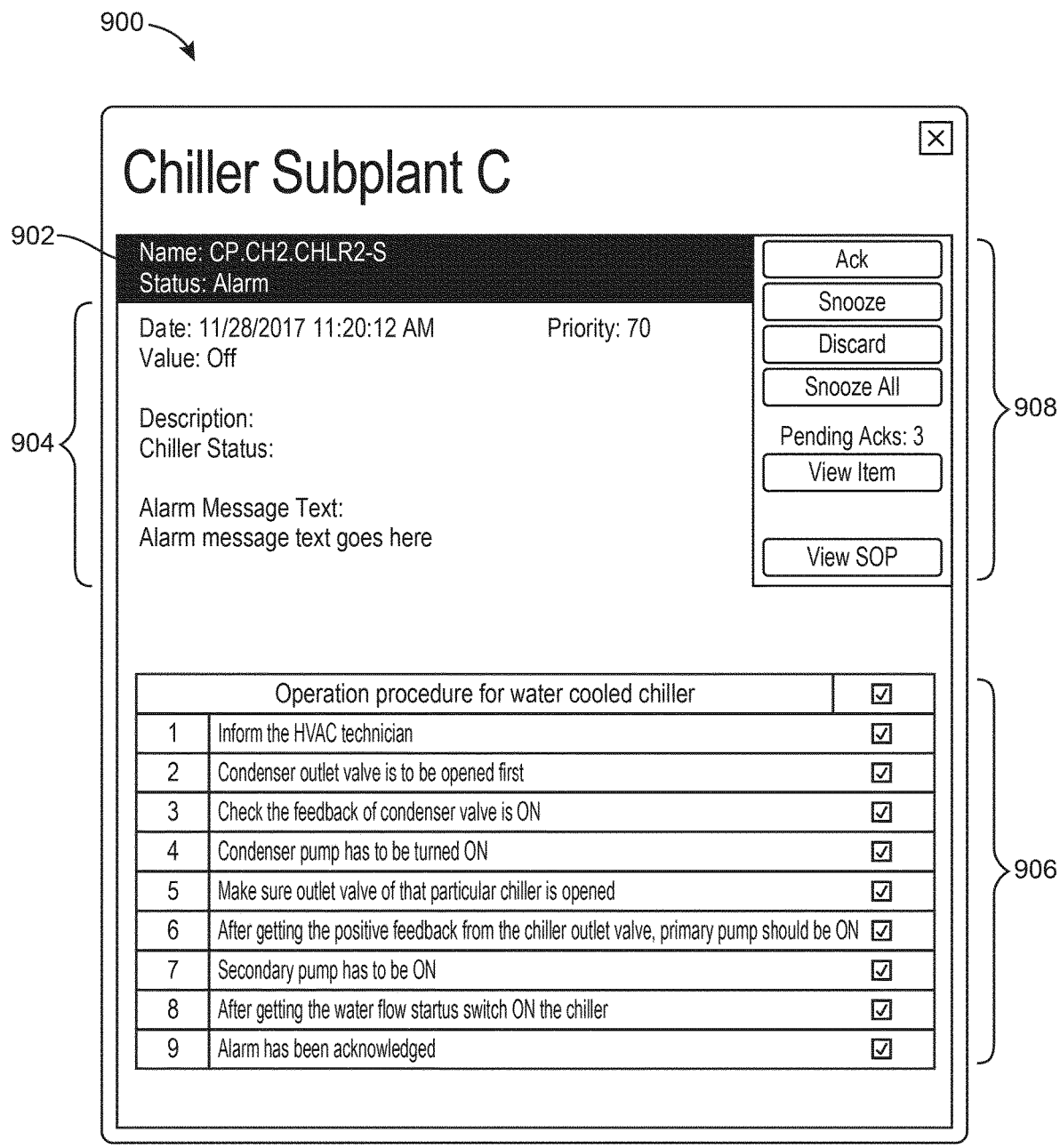
FIG. 9 is a drawing of an alarm event interface with a standard operating procedure, which can be generated by the building alarm management system of FIG. 5, according to an exemplary embodiment.

In some embodiments, the SOP may contain a step-by-step task list for solving the raised alarm, wherein sending the alarm notification is the first step. For reference, an example step-by-step task list for solving the raised alarm is shown in FIG. 9, which is described in greater detail below. Still referring to FIG. 7A, when the operator has completed the first step in the SOP, the operator may mark the task complete (e.g., check the task box, "cross-off," etc.) the step from SOP, which may be automatically reported to building alarm management system 502 via alarm progress module 622. In the event that the alarm is raised due to malfunctioning HVAC equipment, the SOP may include such steps as informing an HVAC technician, checking the equipment, replacing necessary parts, and switching on/off the equipment as necessary. The completed steps of the SOP may be reported individually via alarm progress module 622, or may only be reported once the entire SOP has been completed.

In various embodiments, some or all of the steps may be completed manually while some or all of the steps may be completed automatically, including updating the progress of the step-by-step task list. Various options include:
1. All of the tasks on the step-by-step task list are completed manually, and BMS operator updates the task list manually.
2. All of the task on the step-by-step task list are completed manually, and alarm progress module 622 updates the task list automatically.
3. All of the tasks on the step-by-step task list are completed automatically by building alarm management system 502, and BMS operator updates the task list manually.
4. All of the tasks on the step-by-step task list are completed automatically by building alarm management system 502, and alarm progress module 622 updates the task list automatically.

Certain embodiments may include a combination of the options presented above, and are not limited to the options described above.

Process 700 is shown to further include an operator clicking on the next step which sends a notification to the next department (step 712). In step 712, the operator may select, via alarm notifier application 518, a second or any additional step in the SOP. In some embodiments, this refers to the BMS operator choosing to engage a later step in the SOP by clicking on that particular step (e.g., SOP action item). The building alarm management system 502 may be configured to automatically send a notification to another user, such as another department associated with the raised alarm based on the selection from the operator. In some embodiments, the notification may provide a real-time status update regarding progress in performing the SOP via alarm progress module 622. In some embodiments, the notification may be sent via alarm notifier application 518. The notification may be sent in relation to any step of the SOP being completed by the operator.

Process 700 is shown to further include the alarm notification being sent to security/rescue and PA team automatically behind the scenes (step 714). Upon determining that the alarm is critical (e.g., "YES" to step 708), a BMS operator may provide a notification (e.g., alarm notification, alert, push notification, etc.) to various devices and/or personnel (e.g., security/rescue, PA team, etc.). In step 714, an alarm notification is sent, e.g., via alarm notification module 620, to a response team (e.g., emergency response team, building security, fire department, etc.) who are responsible for solving the alarm. In some embodiments, building alarm management system 502 may automatically send the alarm notification to the response team determined by SOP parser 618 based on the SOP retrieved by SOP selector 614.

Process 700 is shown to include the security/rescue team visiting the location and sending updates to the BMS application (e.g., via SMS, via email, etc.) and the operator and PA can see the updates on their respective application (step 716). In step 716, the response team (e.g., security/rescue team, etc.) responds to the notification by visiting the building location, and sends one or more updates to building alarm management system 502 (e.g., via alarm notifier application 518, a SMS text message, a MMS message, an email, etc.) regarding progress in resolving the alarm. In some embodiments, the progress may be automatically determined by alarm progress module 622 based on the completed steps of the SOP.

Process 700 is shown to include updating the application once the security incident has been controlled (step 718). In some embodiments, updating the application may refer to updating the task list, solving the alarm (e.g., deleting/completing the alarm notification), notifying the BMS operator, or various other methods of updating. Step 718 may be completed automatically (e.g., via alarm notifier application 518) or manually (e.g., via a BMS operator).

Process 720 is shown to include sending an automatic notification to the BMS operator and, based on the steps successfully carried out, auto-acknowledge the alarm (step 720). In step 720, whether the alarm raised was critical or not, an automatic notification is sent by building alarm management system 502 to the BMS operator to indicate if the SOP was successfully carried out and if the alarm is resolved. In some embodiments, the notification may be determined and sent by alarm progress module 622. In some embodiments, in step 720 the building alarm management system 502 will send the notification not only to the operator, but to all users who may have been affected by the raised alarm, such as any users who were located within the building at the time the alarm was generated.

Figure 7B:
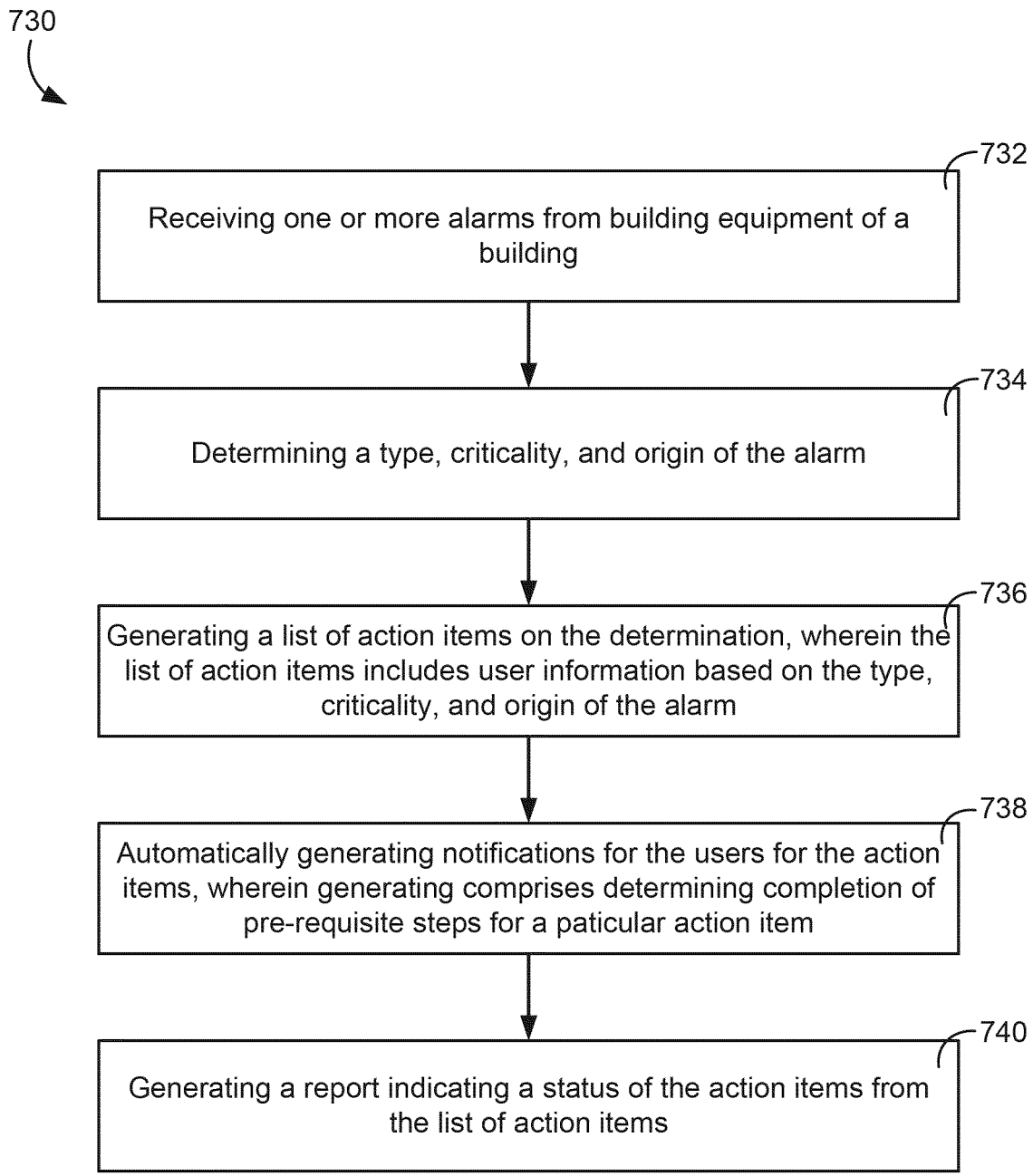
FIG. 7B is a flow diagram of another process for automatically managing alarms using the building alarm management system of FIG. 5, according to some embodiments.

Referring now to FIG. 7B, another process 730 for an integrated standard operating procedure of the building alarm management system 502 is shown, according to an exemplary embodiment. In some embodiments, process 730 is implemented by building alarm management system 502.

Process 730 is shown to include receiving one or more alarms from building equipment of a building (step 732). In some embodiments, building alarm management system 502 will receive alarms (e.g., alarm signals, raised alarms, etc.) from one or more systems (e.g., fire detection and alarm system 504, access control system 506, etc.) from within building 10.

Process 730 is shown to include determining a type, criticality, and origin of the alarm (step 734). In various embodiments, the alarm or alarms need to be categorized such that different SOP's can be implemented for different alarms. For example, alarm determination module 612 determines that a received alarm from access control system 506 indicates that there is a break in to building 10 and that the alarm is critical. Alarm determination module 612 may provide the type (e.g., fire, break-in, etc.), criticality (e.g., emergency, critical, non-critical, etc.), and/or origin (e.g., received from access control system 506, incident occurred in building zone 2-A, etc.).

Process 730 is shown to include generating a list of action items on the determination, wherein the list of action items includes user information based on the type, criticality, and origin of the alarm (step 736). In some embodiments, this step is performed by SOP selector 614, SOP database 616, or a combination of both. Once SOP selector receives the type, criticality, and/or origin of the device, SOP selector 614 may select the appropriate SOP for the received alarm.

Process 730 is shown to include automatically generating notifications for the users for the action items, wherein generating comprises determining completion of pre-requisite steps for a particular action item (step 738). In some embodiments, building alarm management system 502 will provide information to a user (e.g., via application services 624) regarding the status of the selected SOP. For example, application services 624 may provide an updated task list of the SOP, wherein the task list is periodically (e.g., every 5 seconds, every 10 seconds, etc.) updated to provide the user (e.g., BMS operator) with a real-time status update of the SOP. In a general embodiment, a BMS operator for system 400, 500, or a combination thereof will receive, via alarm notifier application 518, status updates regarding an implemented SOP after building alarm management system 502 receives an alarm signal.

Process 730 is shown to include generating a report indicating a status of the action items from the list of action items (step 740). In some embodiment, alarm progress module 622 will generate a report for the user indication the general stratus of the completed action items. In other embodiments, different components of building alarm management system 502 generate the report.

Alarm Application Interfaces

Referring now to FIGS. 8-11, several alarm notifier user interfaces 800-1000 which can be generated by an application such as the alarm notifier application 518 are shown, according to an exemplary embodiment. In some embodiments, the application for user interfaces 800-100 is stored on an on-prem server and can be accessed, generated, managed, and/or updated via building alarm management system 502. In some embodiments, the alarm notifier application 518 is a mobile application configured to run on mobile devices. For example, the alarm notifier application 518 can be a smartphone application configured to run on smartphones or other mobile device platforms (e.g. tablets, PDAs, laptops, etc.). In other embodiments, the alarm notifier application 518 can be a web application (i.e., an application configured to run in a web browser) or other type of application configured to run on mobile devices (e.g., smartphones, tablets, laptop computers, etc.) or non-mobile devices (e.g., desktop computers, client workstations, security terminals, etc.) either inside or outside of building 10. In some embodiments, a BMS operator may view the interface opening a web browser and accessing the application via the internet. In other embodiments, the application is a software-as-a-service (SaaS) or another type of software service, and is accessed via a cloud network. In such an embodiment, BMS operators may access the cloud network via building alarm management system 502.

Figure 8:
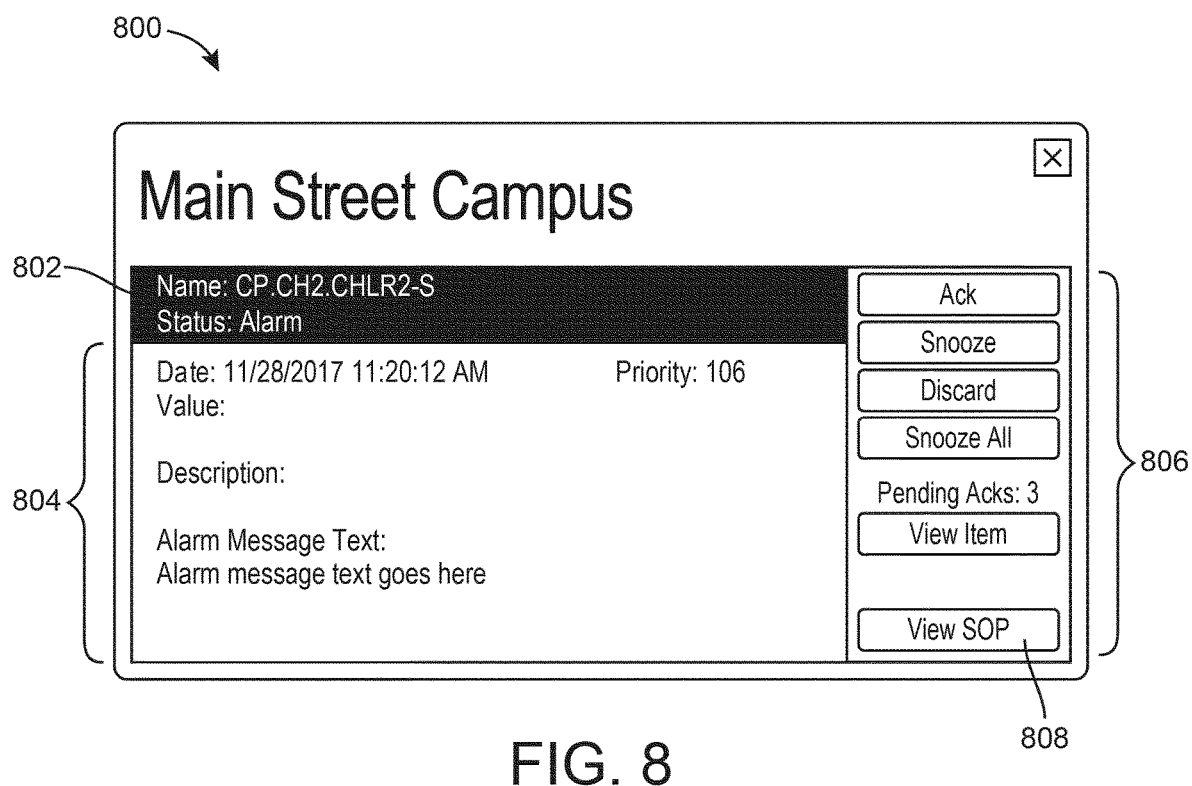
FIG. 8 is a drawing of an alarm event interface, which can be generated by the building alarm management system of FIG. 5, according to an exemplary embodiment.

Referring now to FIG. 8, an alarm notification interface 800 is shown, according to some embodiments. Alarm notification interface 800 is shown to include heading 802, alarm description box 804, widget tabs 806, and selector 808. In some embodiments, the alarm notification interface 800 is displayed on various BMS devices (e.g., devices 516, desktops, BMS operator control devices, BMS operator's desktop, etc.) when an alarm is first generated, and/or when the alarm notifier application 518 is first launched. The alarm notification interface 800 provides a user with information regarding the generated alarm. In some embodiments, alarm notification interface 800 may be presented to an operator and/or a response team associated with a raised alarm, which may be determined by SOP parser 618. Alarm notification interface 800 may be presented to the operator or response team via alarm notification application 518 by alarm notification module 620. The alarm notification interface 800 is shown to include a heading 802 and an alarm description box 804. In some embodiments, heading 802 may display the name of an alarm. The name of the alarm may correspond to the type, criticality, and origin of the alarm. In some embodiments, alarm description box 804 may display information associated with the alarm, such as date of the generated alarm, priority or criticality of the alarm, a description of the alarm, and any other features of the alarm. Widget tabs 806 may allow a user to access more detail regarding the alarm notification. For example, a user may click on selected icon "View SOP" with selector 808 to view a more detailed outline of the procedures and steps within the SOP (e.g., a task list). An example task list is shown in more detail with reference to FIG. 9 below.

Referring now to FIG. 9, an alarm notification interface with a SOP task list is shown, according to exemplary embodiments. In some embodiments, interface 900 may be displayed on similar devices to that of interface 800 described above. Interface 900 is shown to include heading 902, alarm description box 904, task list 906, and widget tables 908. Heading 902, alarm description box 904, and widget tabs 908 may be identical or substantially similar to heading 802, alarm description box 804, and widget tables 806 respectively. In some embodiments, interface 900 will display task list 906, either automatically or in response to a user command. Task list 906 may outline some or all of the steps (e.g., action steps, tasks, etc.) required to complete and/or delete the alarm notification. For example, interface 900 is currently showing tasks for a chiller alarm, wherein task list 906 shows "Inform HVAC technician," as a first step, and "condenser outlet valve is to be open first," as a second step. The task list 906 further includes status boxes (shown on the far right side of task list 906). In some embodiments, a user (e.g., BMS operator) may be able to engage (e.g., click on, check, etc.) these status boxes such that the user may monitor the progress of the SOP. In other embodiments, building alarm management system 502 may updated the interface automatically. For example, alarm progress module 622 may update step 5 as "complete" by providing a status update signal to device 516 where interface 900 is located.

In some embodiments, various steps of task list 906 may be tagged (e.g., proximate to, near, etc.) with an indication of whether that step can be performed automatically or whether user/human involvement is needed. In some embodiments, if the step can be performed automatically, the tag indicates which automated component can perform that step. The tag may further includes criteria that allows the system to select a component to perform that step. In other embodiments, if the step requires user involvement, the tag includes a list of criteria that helps the system determine a specific user to which the alarm or SOP step should be sent. For example, step one in task list 906 states "inform the HVAC technician." This step may be tagged such that the user can select to send an alarm directly to the HVAC technician from the interface 900. In some embodiments, the criteria specified by the tags can be compared against attributes of the users to determine the best person to whom the alarm or SOP should be sent.

Figures 10A, 10B, 10C:
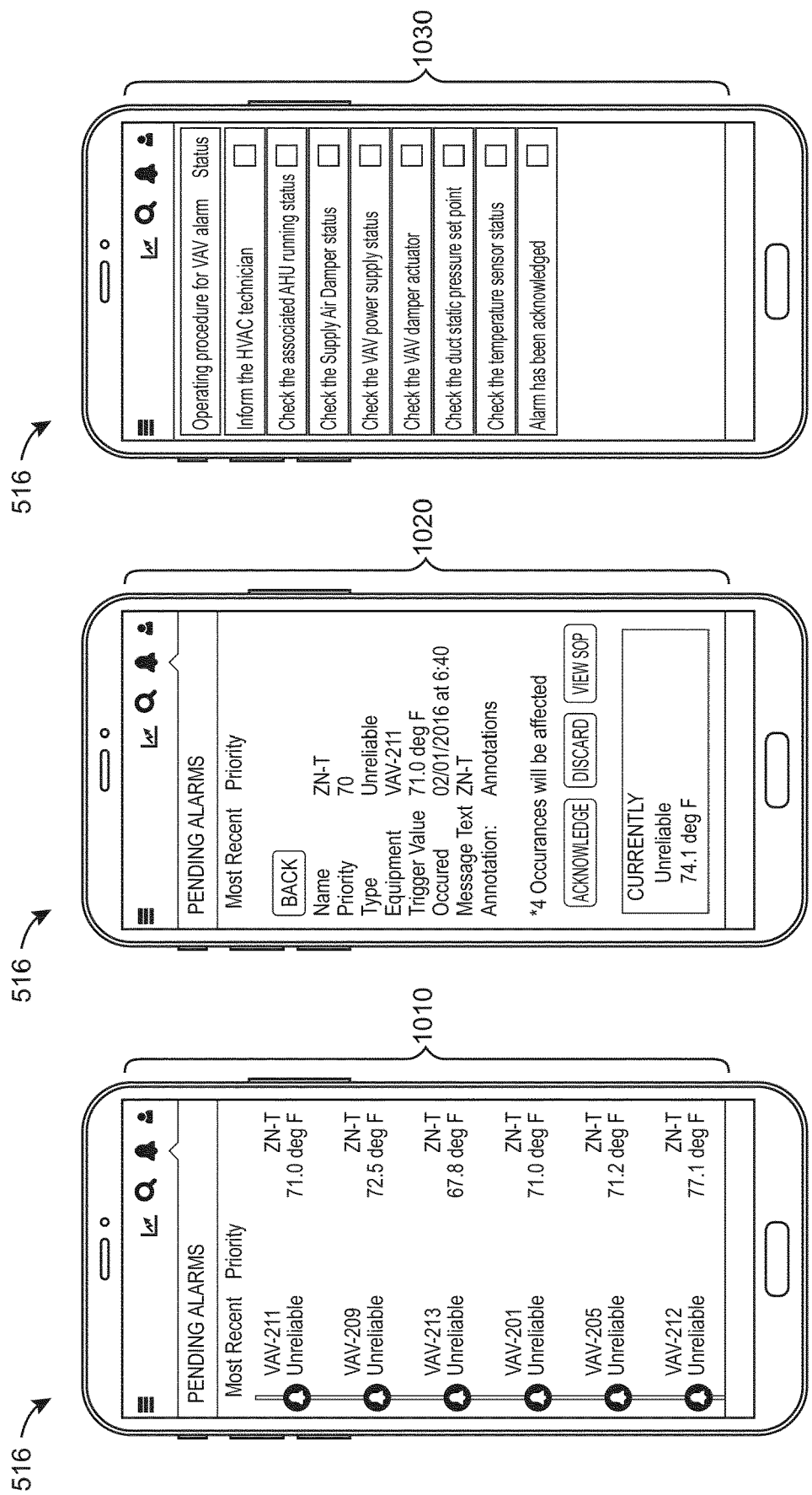
FIGS. 10A-10C are illustrations of a mobile user interface which can be generated by the building alarm management system of FIG. 5, according to an exemplary embodiment.

Referring now to FIGS. 10A-10C, various interfaces on device 516 are shown, according to exemplary embodiments. FIG. 10A shows interface 1010 on device 516, FIG. 10B shows interface 1020, and FIG. 10C shows interface 1030 on device 516. The mobile user interfaces 1010-1030 may be configured to present data associated with the generated alarm via alarm notification application 518 run on devices 516. In some embodiments, the interfaces 1010-1030 may be configured to present such information as described in reference to alarm notification interface 800 and SOP interface 900. In other embodiments, the interfaces 1010-1030 may be configured to present some or all of the components in interfaces 800, 900.

Figure 11:
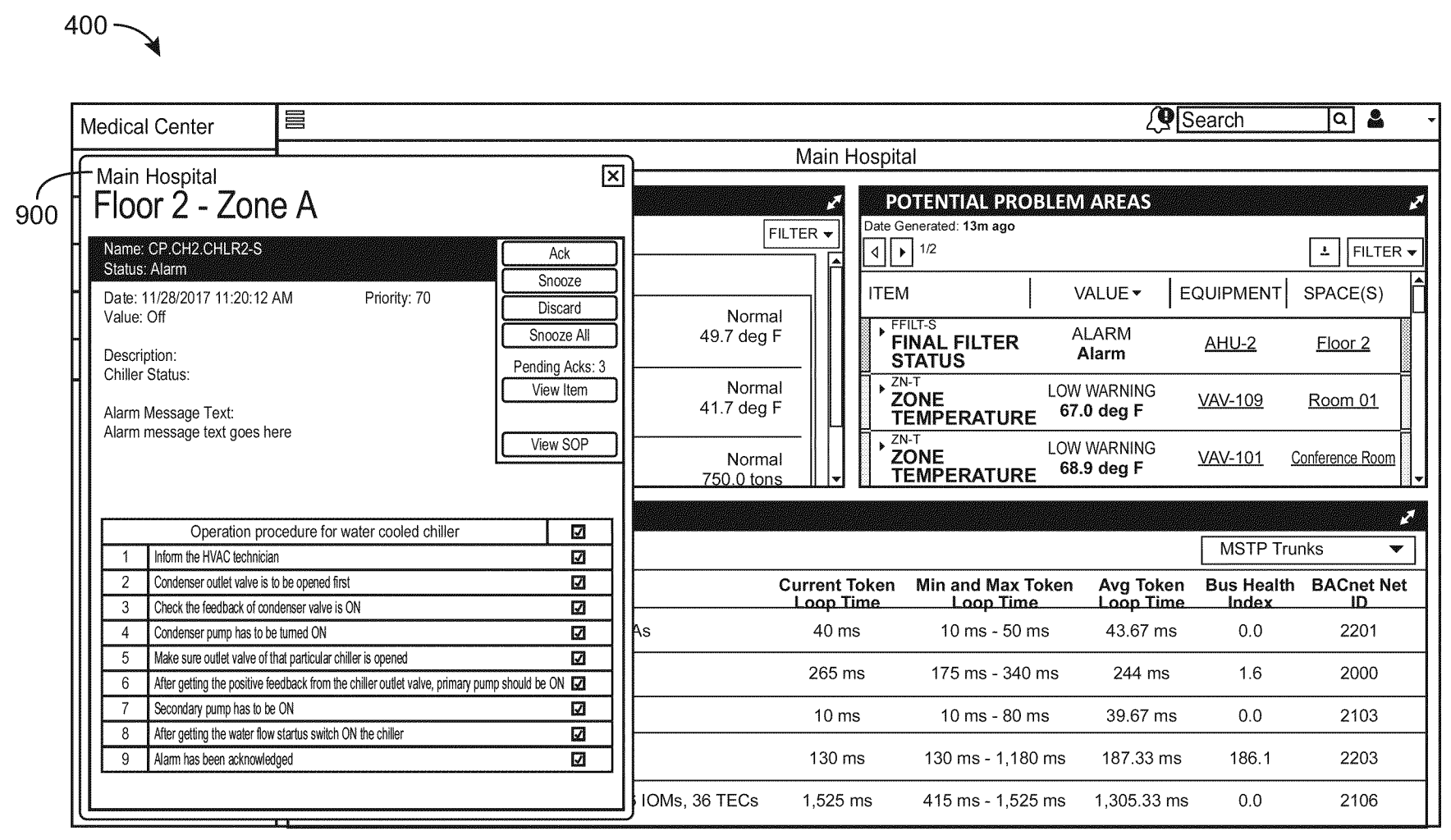

Referring now to FIG. 11, a screen with a pop-up alarm notification is shown, according to an exemplary embodiment. FIG. 11 shows interface 1100 and interface 900 opened up (e.g., popped up, notified, etc.) on interface 1100. In some embodiments, the alarm notifications may be provided as a pop-up window, such that the alarm interface (e.g., interface 900) is displayed on top of interface 1100 automatically.

Figure 12:
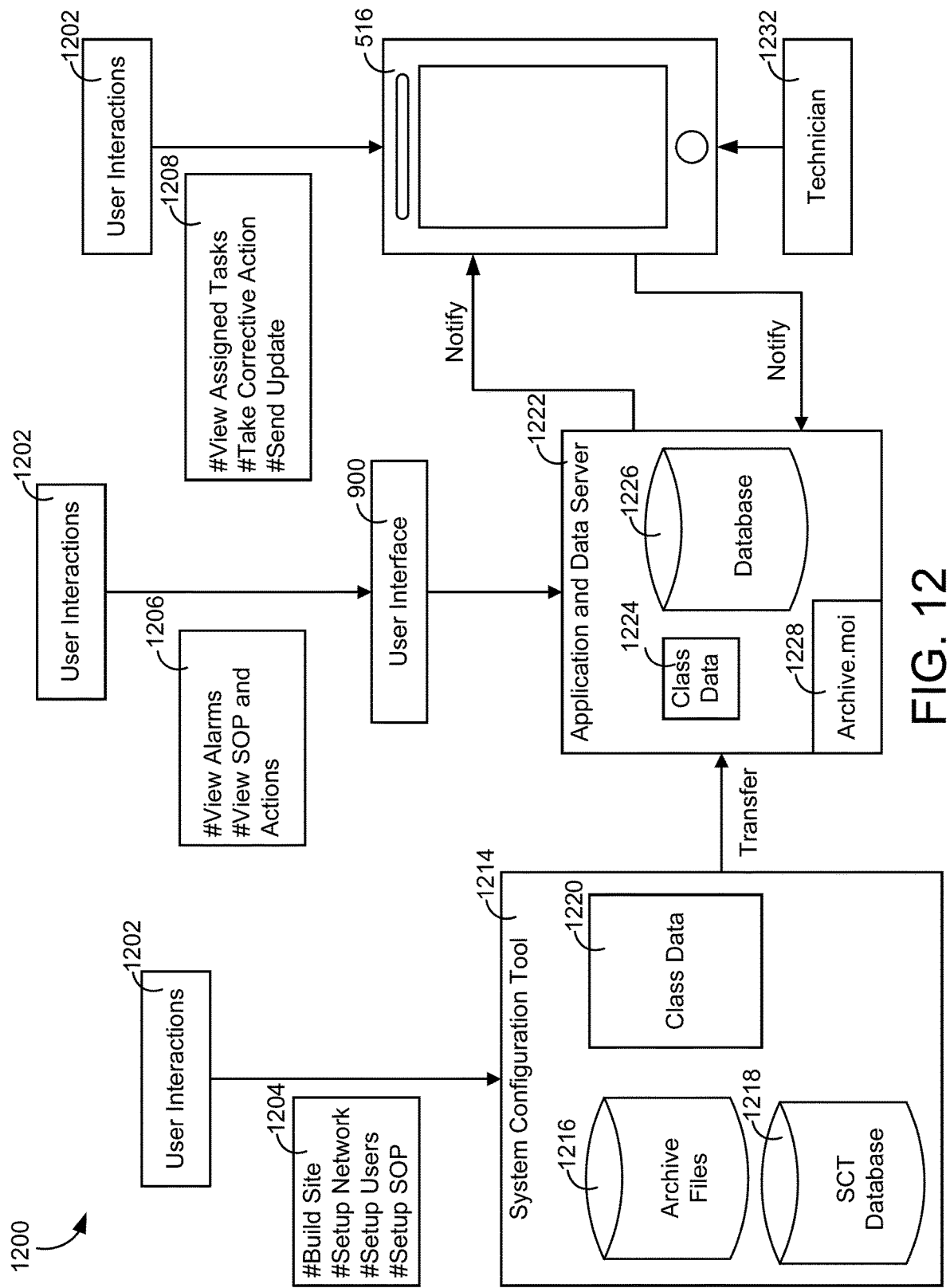
FIG. 12 is a block diagram illustrating user interactions with various components of the building alarm management system of FIG. 5, according to an exemplary embodiment.

Referring now to FIG. 12, a block diagram of system 1200 for integrating SOP's within a BMS, according to exemplary embodiments. System 1200 may be incorporated into system 400, 500, 600, or any combination thereof. FIG. 12 is shown to include user interactions 1202, information boxes 1204-1208, user interface 900, system configuration tool (SCT) 1214, application and data server (ADS) 1222, device 516, and technician 1232. SCT 1214 is shown to include archive files 1216, SCT database 1218, and class data 1220. ADS is shown to include class data 1224, database 1226, and archive file 1228.

User interactions 1202 may be the various means by which users (e.g., building occupants, HVAC technicians, etc.) engage with an interface (e.g., user interface 900, user interface 1210, etc.). In some embodiments, user interactions 1202 include a user clicking a mouse on an interface, typing onto a keyboard, or touching a touch-screen. In various embodiments, user interactions 1202 may include any means by which a user interacts with an interface.

Blocks 1204-1208 may represent the items (e.g., tasks, action items, etc.) that may be performed from user interactions 1202 to an interface component (e.g., SCT 1214). Block 1204 shows user interactions providing instructions that can build a site, setup a network, setup users, and setup SOP. Block 1206 shows user interactions 1202 providing instructions that can view alarms and view SOP and actions. Block 1208 shows user interactions 1202 providing instructions that can view assigned tasks, take corrective action, and send updates. In various embodiments, blocks 1204-1208 may represent how a user may configure the BMS in various ways, and are not limited to the examples provided above.

In some embodiments, SCT 1214 is configured to support the engineering, installation, and commissioning of BMS within building 10. SCT 1214 may enable offline generation and configuration of the site (e.g., point naming, integration of building protocol networks such as BACnet, and Lon-Works, integration of third-party protocols such as Modbus, M-Bus, and KNX, integration of local and remote MS/TP devices, etc.). In some embodiments, SCT 1214 is a window displayed on an interface (e.g., interface 900) that allows a user to configure various parts of the BMS. For example, the user may access SCT 1214 to update whether automatic implementation of SOP tasks is engaged. SCT 1214 may be configured to transfer data to application and data server 1222, as shown in FIG. 12.

Archive files 1216 may be configured to store various data within a sever, hard drive, or other storage means. In some embodiments, archive files 1216 include collect multiple data files together into a single file for easier storage, or to compress files to use less storage space. Archive files 1216 may store the operating software for SCT 1214. SCT database 1218 may be configured to store various data (e.g., files, data records, etc.) for SCT 1214. SCT database 1218 can be any type of information storage (e.g., server, FTP server, database server, etc.) located either on-prem (e.g., on a server within building 10, located on premises, etc.) or off-prem (e.g., Saas, cloud storage, located off premises, etc.). SCT database 1218 can be populated with location information about building 10 that specifies the location of, for example, each user and device within building 10. Class data 1220 may include data classes for various data sets within SCT 1214. The generated data classes may include a list of data set allocation attributes and their values. In some embodiments, class data 1220 is used for writing objects within the dataset of SCT 1214.

ADS 1222 may be configured to manage the collection and presentation of various amounts of data for BMS 400, including trend data, event messages, operator transactions, and data from SCT 1214. In some embodiments, ADS 1222 is an entry-level server that runs on personal computers and supports up to several concurrent users (e.g., five users, 10 users, etc.). ADS 1222 may be configured to run on a server operating system to provide extended historical archiving and reporting capabilities. ADS 1222 may communicate with devices 516 to provide and receive updates, notifications, progress reports, or instructions regarding alarms within system 1200. ADS 1222 may receive communications from device 516.

Class data 1224 may include data classes for various data sets within ADS 1222. The generated data classes may include a list of data set allocation attributes and their values. In some embodiments, class data 1224 is used for writing objects within the dataset of ADS 1222. Class data 1224 may be similar to class data 1220 within SCT 1214. Database 1226 may be configured to store various data (e.g., files, data records, etc.) for ADS 1222. Database 1226 can be any type of information storage (e.g., server, FTP server, database server, etc.) located either on-prem (e.g., on a server within building 10, located on premises, etc.) or off-prem (e.g., Saas, cloud storage, located off premises, etc.). Database 1226 can be populated with location information about building 10 that specifies the location of, for example, each user and device within building 10. Archive file 1228 may be an .moi file configured to represent information. Archive file 1228 may be associated with .mod files or .tod files and that are also stored within ADS 1222 and archive file 1228 may be configured to represent the information from the .mod files, .tod files, or both.

Technician 1232 may be any person capable of interacting with system 1200. In some embodiments, technician 1232 is an HVAC technician within building 10 and interacts with system 1200 to assist in resolving alarms. Technician 1232 may be capable of completing manual alarm tasks provided by building alarm management system 502, as shown with reference to FIGS. 6A-B.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for automatically managing and responding to alarms in a building management system, the method comprising:
    obtaining an operating procedure comprising a set of action items to be performed in response to an alarm in the building management system;
    determining, for an action item of the set of action items, whether the action item is capable of being performed automatically by the building management system or whether the action item requires user involvement;
    assigning an indicator to the action item based on capabilities of the building management system, wherein the indicator indicates whether the action item is capable of being performed automatically by the building management system or whether the action item requires user involvement;
    in response to determining that the action item is capable of being performed automatically, automatically performing the action item by the building management system; and
    in response to determining that the action item requires user involvement, providing the action item to a user device for action by a user.

2. The method of claim 1, wherein obtaining the operating procedure comprises:
    receiving the alarm in the building management system; and
    selecting the operating procedure from a plurality of stored operating procedures based on attributes of the alarm comprising at least one of a type of the alarm, a criticality of the alarm or an origin of the alarm.

3. The method of claim 1, wherein determining whether the action item is capable of being performed automatically comprises:
    determining, based on the action item, a capability of the building management system required to perform the action item; and
    determining whether one or more components within the building management system have the capability.

4. The method of claim 1, wherein the action item is a first action item, the method further comprising:
    tracking a completion status of the first action item;
    identifying a second action item in the set of action items to which the first action item is a prerequisite; and
    delaying starting the second action item until the completion status of the first action item indicates that the first action item is complete in response to identifying the first action item as the prerequisite to the second action item.

5. A method for automatically managing and responding to alarms in a building management system, the method comprising:
    obtaining an operating procedure comprising a set of action items to be performed in response to an alarm in the building management system;
    determining, for an action item of the set of action items, whether the action item is capable of being performed automatically by the building management system or whether the action item requires user involvement;
    in response to determining that the action item is capable of being performed automatically, automatically performing the action item by the building management system; and
    in response to determining that the action item requires user involvement, providing the action item to a user device for action by a user, wherein providing the action item to the user device for action by the user comprises:
        determining, based on the action item, one or more user attributes required for the user to handle the action item, the user attributes comprising at least one of j ob title, capabilities, knowledge, expertise, or permissions; and
        selecting the user from a plurality of users in response to determining that the user has one or more of the attributes.

6. A method for automatically managing and responding to alarms in a building management system, the method comprising:
    obtaining an operating procedure comprising a set of action items to be performed in response to an alarm in the building management system;
    determining, for an action item of the set of action items, whether the action item is capable of being performed automatically by the building management system or whether the action item requires user involvement;
    in response to determining that the action item is capable of being performed automatically, automatically performing the action item by the building management system;

in response to determining that the action item requires user involvement, providing the action item to a user device for action by a user;
automatically generating a plurality of notifications indicating a progress on a completion of the action item;
receiving locations for a plurality of user devices, the user devices comprising one or more building operator devices;
transmitting a first notification of the plurality of notifications to the plurality of user devices; and
transmitting a second notification of the plurality of notifications to the one or more building operator devices, the second notification comprising instructions for a user to complete the action item.

7. A building management system for automatically managing and responding to alarms, the system comprising:
a processing circuit comprising one or more processors and memory storing instructions that, when executed by the one or more processors, cause the one or more processors to perform operations comprising:
obtaining an operating procedure comprising a set of action items to be performed in response to an alarm in the building management system;
determining, for an action item of the set of action items, whether the action item is capable of being performed automatically by the building management system or whether the action item requires user involvement, wherein determining whether the action item is capable of being performed automatically comprises:
determining, based on the action item, a capability of the building management system required to perform the action item; and
determining whether one or more components within the building management system have the capability;
in response to determining that the action item is capable of being performed automatically, automatically performing the action item by the building management system;
in response to determining that the action item requires user involvement, providing the action item to a user device for action by a user.

8. The system of claim 7, wherein obtaining the operating procedure comprises:
receiving the alarm in the building management system; and
selecting the operating procedure from a plurality of stored operating procedures based on attributes of the alarm comprising at least one of a type of the alarm, a criticality of the alarm or an origin of the alarm.

9. The system of claim 7, wherein determining whether the action item is capable of being performed automatically comprises:
assigning an indicator to the action item based on capabilities of the building management system, wherein the indicator indicates whether the action item is capable of being performed automatically by the building management system or whether the action item requires user involvement.

10. The system of claim 7, wherein providing the action item to a user device for completion by a user comprises:
determining, based on the action item, one or more user attributes required for the user to handle the action item, the user attributes comprising at least one of job title, capabilities, knowledge, expertise, or permissions; and
selecting the user from a plurality of users in response to determining that the user has one or more of the attributes.

11. The system of claim 7, the to operations further comprising:
tracking a completion status of the action item as a first action item;
identifying a second action item in the set of action items to which the first action item is a prerequisite; and
delaying starting the second action item until the completion status of the first action item indicates that the first action item is complete in response to identifying the first action item as the prerequisite to the second action item.

12. The system of claim 7, the operations further comprising:
automatically generating a plurality of notifications indicating a progress on a completion of the action item;
receiving locations for a plurality of user devices, the user devices comprising one or more building operator devices;
transmitting a first notification of the plurality of notifications to the plurality of user devices; and
transmitting a second notification of the plurality of notifications to the one or more building operator devices, the second notification comprising instructions for a user to complete the action item.

13. A building management system device for automatically managing and responding to alarms, the system comprising:
a processing circuit comprising one or more processors and memory storing instructions that, when executed by the one or more processors, cause the one or more processors to perform operations comprising:
obtaining an operating procedure comprising a set of action items to be performed in response to an alarm;
determining, for a first action item of the set of action items, whether the first action item is capable of being performed automatically or whether the first action item requires user involvement;
in response to determining that the first action item is capable of being performed automatically, automatically performing the first action item;
in response to determining that the first action item requires user involvement, providing the first action item to a user device for completion by a user;
tracking a completion status of the first action item;
identifying a second action item in the set of action items to which the first action item is a prerequisite; and
delaying starting the second action item until the completion status of the first action item indicates that the first action item is complete in response to identifying the first action item as the prerequisite to the second action item.

14. The system of claim 13, wherein obtaining the operating procedure comprises:
receiving the alarm in the building management system; and
selecting the operating procedure from a plurality of stored operating procedures based on attributes of the alarm comprising at least one of a type of the alarm, a criticality of the alarm or an origin of the alarm.

15. The system of claim 13, wherein determining whether the first action item is capable of being performed automatically further comprises:

assigning an indicator to the first action item based on capabilities of the building management system, wherein the indicator indicates whether the first action item is capable of being performed automatically by the building management system or whether the first action item requires user involvement.

16. The system of claim 13, wherein determining whether the first action item is capable of being performed automatically comprises:
   determining, based on the first action item, a capability of the building management system required to perform the first action item; and
   determining whether one or more components within the building management system have the capability.

17. The system of claim 13, wherein providing the first action item to a user device for completion by a user comprises:
   determining, based on the first action item, one or more user attributes required for the user to handle the first action item, the user attributes comprising at least one of job title, capabilities, knowledge, expertise, or permissions; and
   selecting the user from a plurality of users in response to determining that the user has one or more of the attributes.

* * * * *